US012441120B2

(12) United States Patent
Zhu et al.

(10) Patent No.: US 12,441,120 B2
(45) Date of Patent: Oct. 14, 2025

(54) INK CARTRIDGE

(71) Applicant: ZHUHAI NINESTAR MANAGEMENT CO., LTD., Guangdong (CN)

(72) Inventors: Yijing Zhu, Zhuhai (CN); Jingzhang Xia, Zhuhai (CN); Shichao Liang, Zhuhai (CN); Haoming Ma, Zhuhai (CN); Zhizheng Jia, Zhuhai (CN); Jiabiao Huang, Zhuhai (CN)

(73) Assignee: ZHUHAI NINESTAR MANAGEMENT CO., LTD., Zhuhai (CN)

( * ) Notice: Subject to any disclaimer, the term of this patent is extended or adjusted under 35 U.S.C. 154(b) by 212 days.

(21) Appl. No.: 18/185,651

(22) Filed: Mar. 17, 2023

(65) Prior Publication Data

US 2023/0219345 A1 Jul. 13, 2023

Related U.S. Application Data

(63) Continuation of application No. PCT/CN2021/117031, filed on Sep. 7, 2021.

(30) Foreign Application Priority Data

Sep. 21, 2020 (CN) ........................ 202022074579.X
Dec. 23, 2020 (CN) ........................ 202023127670.X
(Continued)

(51) Int. Cl.
*B41J 2/175* (2006.01)

(52) U.S. Cl.
CPC ......... *B41J 2/17553* (2013.01); *B41J 2/1752* (2013.01); *B41J 2/17526* (2013.01); *B41J 2/1753* (2013.01)

(58) Field of Classification Search
CPC ... B41J 2/17553; B41J 2/1752; B41J 2/17526
See application file for complete search history.

(56) References Cited

U.S. PATENT DOCUMENTS 11,285,725 B2 * 3/2022 Aoki ........................ B41J 2/175
2011/0001773 A1 1/2011 Bianco et al.
(Continued)

FOREIGN PATENT DOCUMENTS

CN 1445094 A 10/2003
CN 101121333 A 2/2008
(Continued)

OTHER PUBLICATIONS

International Search Report and Written Opinion issued on Nov. 26, 2021 in corresponding International application No. PCT/CN2021/117031; 16 pages.
(Continued)

*Primary Examiner* — Geoffrey S Mruk
(74) *Attorney, Agent, or Firm* — Maier & Maier, PLLC

(57) ABSTRACT

An ink cartridge including a cartridge body, a recess part, a positioning part and a chip disposed in the recess part, where the cartridge body includes an ink accommodating chamber for storing ink, the recess part is disposed on an upper side of the cartridge body and includes a side wall, at least a portion of the side wall is configured to limit a relative position between the ink cartridge and the image forming device in a first direction; the positioning part is disposed above the side wall, and in a second direction, at least a portion of the positioning part is located on a rear end side of the chip and is configured to limit the relative position between the ink cartridge and the image forming device in a third direction.

19 Claims, 23 Drawing Sheets

(30) Foreign Application Priority Data

| | | |
|---|---|---|
| Jan. 13, 2021 | (CN) | 202120086012.6 |
| Jan. 13, 2021 | (CN) | 202120086036.1 |
| Feb. 26, 2021 | (CN) | 202120428768.4 |

(56) References Cited

U.S. PATENT DOCUMENTS

| | | | |
|---|---|---|---|
| 2013/0194357 | A1 | 8/2013 | Karasawa et al. |
| 2015/0085035 | A1 | 3/2015 | Aoki |
| 2017/0066249 | A1 | 3/2017 | Ono et al. |
| 2020/0238719 | A1 | 7/2020 | Oya et al. |

FOREIGN PATENT DOCUMENTS

| | | | |
|---|---|---|---|
| CN | 101844454 | A | 9/2010 |
| CN | 102555502 | A | 7/2012 |
| CN | 203401816 | U | 1/2014 |
| CN | 106004064 | A | 10/2016 |
| CN | 213353955 | U | 6/2021 |
| EP | 1905594 | A1 | 4/2008 |
| JP | S615949 | A | 1/1986 |
| JP | H01141752 | A | 6/1989 |
| JP | H0359166 | U | 6/1991 |
| JP | H1170665 | A | 3/1999 |
| JP | 2003266733 | A | 9/2003 |
| JP | 2004314558 | A | 11/2004 |
| JP | 2012140011 | A | 7/2012 |
| JP | 2013006348 | A | 1/2013 |
| JP | 2014193616 | A | 10/2014 |
| JP | 2015047839 | A | 3/2015 |
| JP | 201724423 | A | 2/2017 |
| JP | 201756706 | A | 3/2017 |
| JP | 2017121740 | A | 7/2017 |
| JP | 2017185639 | A | 10/2017 |
| JP | 2019018370 | A | 2/2019 |

OTHER PUBLICATIONS

Chinese Notification to Grant a Patent issued on Sep. 8, 2021 in corresponding application No. 202120086012.6; 2 pages.

Chinese Notification to Grant a Patent issued on Sep. 26, 2021 in corresponding application No. 202120086036.1; 2 pages.

Office Action issued on Dec. 20, 2023, in corresponding Japanese Application No. 2023-504308, 6 pages.

Extended European Search Report issued on Feb. 16, 2024, in corresponding European Application No. 21868517.0, 8 pages.

Office Action issued on Apr. 30, 2025, in corresponding Japanese Application No. 2024-087387, 10 pages.

* cited by examiner

INK CARTRIDGE

CROSS-REFERENCE TO RELATED APPLICATIONS

The present application is a continuation of International Application No. PCT/CN2021/117031, filed on Sep. 7, 2021, which claims priority to Chinese Patent Application No. 202022074579.X filed on Sep. 21, 2020, Chinese Patent Application No. 202023127670.X, filed on Dec. 23, 2020, Chinese Patent Application No. 202120086012.6, filed on Jan. 13, 2021, Chinese Patent Application No. 202120086036.1, filed on Jan. 13, 2021 and Chinese Patent Application No. 202120428768.4, filed on Feb. 26, 2021. The disclosures of the aforementioned applications are incorporated herein by reference in their entireties.

TECHNICAL FIELD

The present application relates to the technical field of image forming devices, in particular, to an ink cartridge.

BACKGROUND

An image forming device, such as a printer, is increasingly being used in people's life and work. An ink cartridge, as one of consumables of the printer, is indispensable in people's life and work.

When the ink cartridge in the printer is used up, it is necessary to remove the used-up ink cartridge from a mounting part of the printer, and a new ink cartridge is mounted into the mounting part of the printer, and then the printer can continue to print. How to realize the matching and positioning between the ink cartridge and the mounting part of the printer is very important for the ink cartridge. If the matching and positioning are not good, there may be problems such as interference during the mounting process, and ineffective mounting of the ink cartridge into the mounting part of the printer.

SUMMARY

In order to overcome the above problems of the prior art, a main object of the present application is to provide an ink cartridge capable of reliably matching and positioning with a mounting part of an image forming device.

In order to achieve the above object, the present application specifically employs the following technical solution.

The present application provides an ink cartridge detachably mounted in a mounting part of an image forming device, the ink cartridge includes:

a cartridge body including an ink accommodating chamber for storing ink;

a recess part disposed on an upper side of the cartridge body and including a side wall, where at least a portion of the side wall is configured to limit a relative position between the ink cartridge and the image forming device in a first direction;

a chip disposed in the recess part; and a positioning part disposed above the side wall, where in a second direction, at least a portion of the positioning part is located on a rear end side of the chip and is configured to limit the relative position between the ink cartridge and the image forming device in a third direction; where the first direction is a width extension direction of the cartridge body, the second direction is a mounting direction of the ink cartridge mounted to the mounting part, and the third direction is a height extension direction of the cartridge body.

Compared with the prior art, in the present application, the cartridge body is provided with a recess part and a positioning part, and when the ink cartridge is mounted to the mounting part of the image forming device, the relative position between the ink cartridge and the image forming device is limited by the recess part in the first direction, and the relative position between the ink cartridge and the image forming device is limited by the positioning part in the third direction, to reliably realize the matching and positioning between the ink cartridge and the mounting part of the image forming device, thereby ensuring the reliability of the connection of the chip and an ink outlet of the ink cartridge with the image forming device.

The present application further provides an ink cartridge including a cartridge body;

the cartridge body has a front end and a rear end in a mounting direction, the cartridge body includes a front end surface, a rear end surface, a left surface, a right surface, an upper surface and a lower surface; the left surface and the right surface extend in the mounting direction, at least one of the left surface and the right surface is provided with a notch perpendicular to the mounting direction at a position of the rear end;

at least a portion of the notch runs through an upper surface and a lower surface of the cartridge body, and the notch includes a step surface extending in the mounting direction and a transition surface between a first surface and the step surface, where the first surface is the left surface or the right surface; and the step surface is provided with a rear bump extending from bottom to top, and there is a gap between the rear bump and the transition surface; an avoidance space extending to the upper surface of the cartridge body is disposed above the rear bump.

The present application further provides an ink cartridge including a front housing, a rear housing and a cover plate;

the cover plate is provided with an ink amount detection bump for detecting an amount of ink; and a front end of the rear housing has an opening, the cover plate is provided on a side of the rear housing provided with the opening, the front housing is mounted to a front end of the opening, back of the front housing is provided with an abutting part abutting against the cover plate, and the abutting part is close to the ink amount detection bump disposed on the cover plate.

The present application further provides an ink cartridge including an ink bag, a cartridge body and an ink amount detection mechanism, the cartridge body includes a left housing, a right housing and a front housing, the left housing, the right housing and the front housing are enclosed to form an accommodating part for accommodating the ink bag, the cover plate is connected with the ink bag, and the front housing is provided with a detection hole for an elastic cap of the ink amount detection mechanism to extend out and an ink outlet hole for the ink outlet to extend out.

BRIEF DESCRIPTION OF THE DRAWINGS

In order to more clearly illustrate technical solutions of embodiments of the present disclosure, the drawings to be used in the embodiments will be briefly introduced in the following, and it is obvious that the drawings in the following description are only some embodiments of the present disclosure, and for ordinary skilled in the art, other drawings may be obtained based on these drawings without creative labor.

DETAILED DESCRIPTION OF THE EMBODIMENTS

Figure 1:
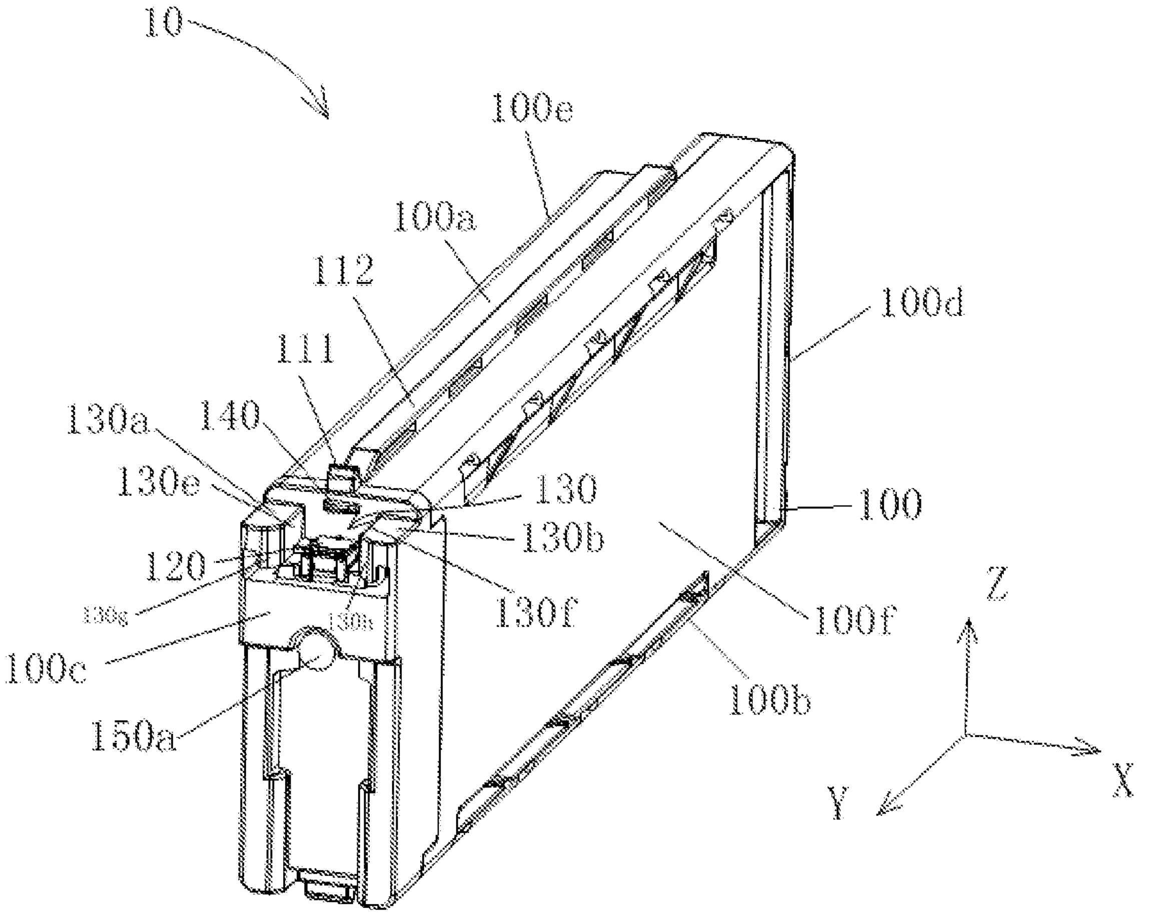
FIG. 1 is a schematic view of an ink cartridge according to Embodiment 1.

In order to make the purposes, technical solutions and advantages of the present application more clear, the present application is further explained in detail below in combination with the drawings and embodiments. It should be understood that the specific embodiments described herein are used only to interpret the present application and are not used to limit the present application.

In the description of the present application, unless otherwise specified and limited, the terms "first" and "second" as used are only for descriptive purpose, and cannot be interpreted to indicate or imply relative importance; unless otherwise specified or stated, the term "a plurality of" means two or more; the terms "connection", "fixing" and the like should be broadly interpreted, for example, "connection" may be a fixed connection, a detachable connection, or an integral connection, or an electrical connection; may be directly connected or indirectly connected via an intermediate medium. For those of ordinary skill in the art, the specific meaning of the above terms in the present application may be interpreted according to specific situations.

In the description of this specification, it is to be understood that the orientation terms "on" and "below" etc. described in the embodiments of the present application are described from the point view shown in the drawings, and should not be interpreted as the limitation on the embodiments of the present application. In addition, in the context, it is also to be understood that when it is mentioned that one element is located "on" or "below" another element, it can not only be directly located "on" or "below" the other element, but can also be indirectly located "on" or "below" the another element through an intermediate element.

Embodiment 1

Figure 2:
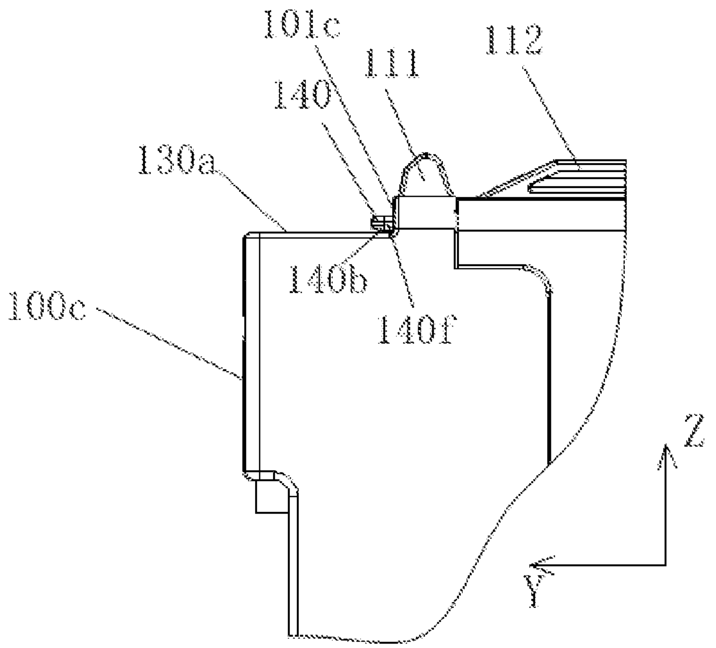
FIG. 2 is a portion of a side view of the ink cartridge according to Embodiment 1.

FIG. 1 is a schematic view of an ink cartridge according to Embodiment 1; FIG. 2 is a portion of a side view of the ink cartridge according to Embodiment 1; and FIG. 3 is a partially exploded schematic view of the ink cartridge according to Embodiment 1.

Figure 3:
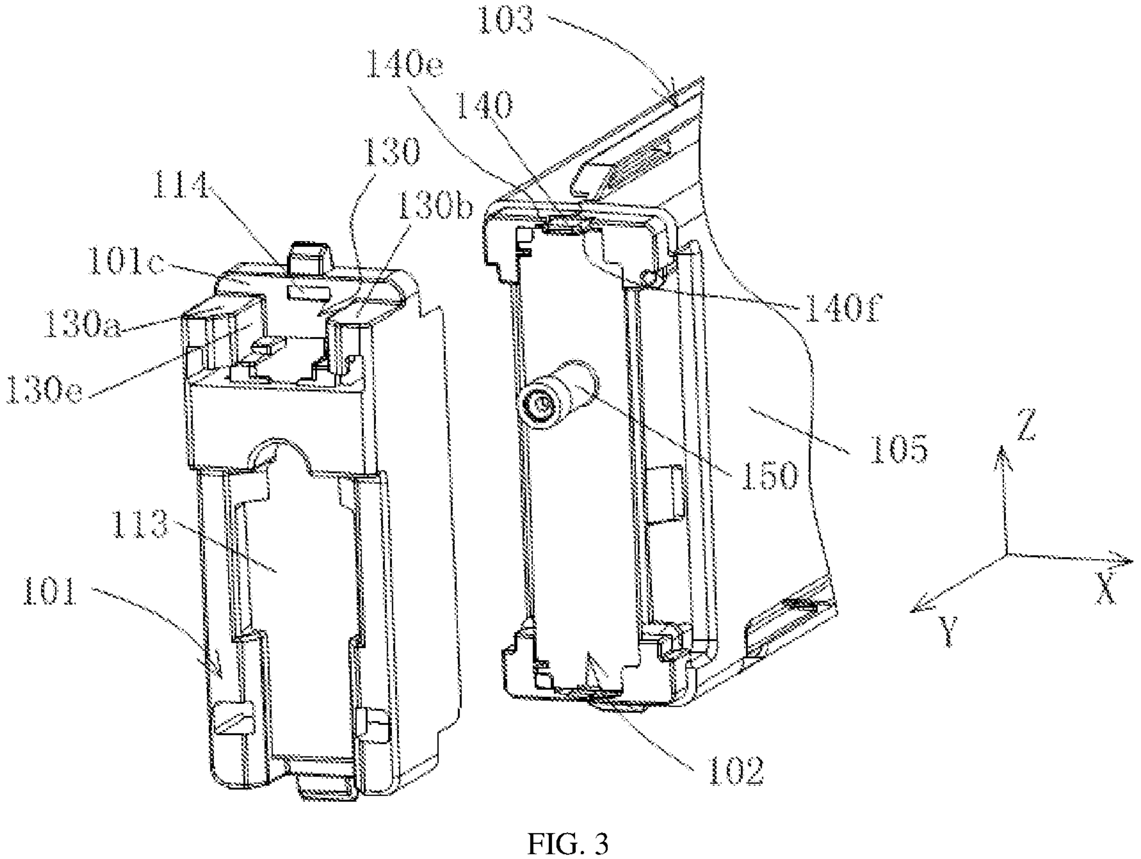
FIG. 3 is a partially exploded schematic view of the ink cartridge according to Embodiment 1.

Referring to FIG. 1, FIG. 2, and FIG. 3, the ink cartridge 10 is detachably mounted on a mounting part of an image forming device. The ink cartridge 10 includes a cartridge body 100, which is in an approximately cuboid shape as a whole, the outline of the cartridge body 100 consists of several housings and has an upper surface 100*a*, a lower surface 100*b*, a front surface 100*c*, a rear surface 100*d*, a left surface 100*e* and a right surface 100*f*. An ink accommodating chamber for storing ink is formed inside the housing of the cartridge body 100. Where the ink accommodating chamber may be a sealed chamber surrounded by an ink bag, or may be a sealed chamber composed of housings, the sealed chamber is used to directly store the ink. In this embodiment, the ink accommodating chamber surrounded by an ink bag 105 is taken as an example for description.

Specifically, a three-dimensional rectangular coordinate system XYZ is established, where X-axis, Y-axis and Z-axis are three coordinate axes perpendicular to each other, with the X-axis as a first direction, the Y-axis as a second direction and the Z-axis as a third direction, that is, a width extension direction of the ink cartridge is the first direction, a length extension direction of the ink cartridge is the second direction, a height extension direction of the ink cartridge is the third direction, and the second direction is a mounting direction in which the ink cartridge 10 is mounted to the mounting part. A direction in which the ink cartridge 10 is mounted to the mounting part of the image forming device is a +Y-axis direction, and a vertical direction under a mounting posture is a −Z-axis direction. An upper surface 100*a* and a lower surface 100*b* are disposed opposite to each other in the Z-axis direction, the upper surface 100*a* is in the +Z-axis direction, the lower surface 100*b* is in the −Z-axis direction, a front surface 100*c* and a rear surface 100*d* are disposed opposite to each other in the Y-axis direction, the front surface 100*c* is in the +Y-axis direction, and the rear surface 100*d* is in the −Y-axis direction. A left surface 100*e* and a right surface 100*f* are disposed opposite to each other in the X-axis direction, the left surface 100*e* is disposed in a −X-axis direction, and the right surface 100*f* is disposed in a +X-axis direction. The left surface 100*e* and the right surface 100*f* are cross-disposed with the upper surface 100*a*, the lower surface 100*b*, the front surface 100*c* and the rear surface 100*d*.

Further, the ink cartridge 10 also includes a chip 120, a recess part 130 and a fixing mechanism. The recess part 130 is disposed at a connection position between the front surface 100*c* and the upper surface 100*a* to define a relative position between the ink cartridge 10 and the image forming device. The chip 120 is disposed in the recess part 130 to communicate with the image forming device and interact data with the image forming device. The fixing mechanism is disposed the upper surface 100*a* and the lower surface 100*b* to clamp with and fix to the image forming device. When the ink cartridge 10 is mounted to the mounting part of the image forming device, the relative position between the ink cartridge 10 and a terminal unit on an image forming device side is defined by the recess part 130, and the ink cartridge 10 and the terminal unit on the image forming device side are clamped and fixed through the fixing mechanism, so as to reliably realize the clamping and positioning between the ink cartridge 10 and the mounting part of the image forming device, and thus ensure the reliability of the connection of the chip 120 and the connection of an ink outlet 150*a*.

In this embodiment, the fixing mechanism is disposed on the upper surface 100*a* and the lower surface 100*b*. It may be understood that in other embodiments, the fixing mechanism may also be disposed only on the upper surface 100*a* or the lower surface 100*b*.

Referring to FIG. 3, the cartridge body 100 includes a front housing 101, a cover plate 102, a left housing 103, a right housing 104 (shown in FIG. 14) and an ink bag 105, the ink cartridge 10 further includes an ink outlet part 150 having an ink outlet 150*a*. An outline of the cartridge body 100 consists of the front housing 101, the left housing 103 and the right housing 104. During assembly, the ink bag 105 and the cover plate 102 are welded together, and then a combination of the ink bag 105 and the cover plate 102 is mounted with the left housing 103 and the right housing 104 together, and then mounted with the front housing 101 to form the cartridge body 100. The fixing mechanism includes a first fixing part 111 and a second fixing part 112, and the first fixing part 111 and the second fixing part 112 are spaced on the upper surface 100*a* and the lower surface 100*b* of the cartridge body 100 in the second direction. When the ink cartridge 10 is mounted to the mounting part of the image forming device in the +Y-axis direction as the mounting direction, the fixed part on the mounting part is clamped into the spacing part between the first fixing part 111 and the second fixing part 112 to prevent the ink cartridge 10 from detaching from the mounting part. The ink outlet part 150 is disposed on the cover plate 102, passes through the through hole 113 in the front housing 101 and is exposed at the front surface 100*c*, so as to supply the ink in the ink bag 105 into the print head of the mounting part of the image forming device, so that the image forming device can complete the printing operation.

The ink cartridge further includes a positioning part 140, the recess part 130 is located on an upper side of the cartridge body 100, that is, the recess part 130 is located on a position at +Z-axis and +Y-axis sides of the cartridge body 100, the recess part 130 is a part of the front housing 101, and the recess part 130 is disposed in the +Y-axis direction of the front surface 100*c*. The chip 120 is disposed on the front housing 101 and located within the recess part 130.

The recess part 130 includes a side wall, and the side wall of the recess part 130 is provided with a positioning surface, and at least part of the positioning surface is disposed above the chip 120 (that is, at least part of the positioning surface is disposed in the +Z-axis direction of the chip 120). A mounting position of the ink cartridge 10 on the image forming device is positioned by the positioning surface. Further, the recess part 130 has a left side wall, a right side wall and a rear side wall. The rear side wall is connected with the left side wall and the right side wall, respectively, and is located between the left side wall and the right side wall. There is a first positioning surface 130*e* on the left side wall, a second positioning surface 130*f* on the right side wall, and a first surface 101*c* on an extension wall of the rear side wall. And at least a portion of the first positioning surface 130*e* and at least a portion the second positioning surface 130*f* are disposed above a terminal of the chip 120 (that is, disposed in the +Z-axis direction of the terminal). Further, at least a portion of the first positioning surface 130*e* and at least a portion of the second positioning surface 130*f* are disposed above the chip 120 (that is, disposed in the +Z-axis direction of the chip 120). The first positioning surface 130*e* and the second positioning surface 130*f* are disposed opposite to each other in the X-axis direction perpendicular to the Y-axis as the mounting direction.

The positioning part 140 is disposed on an extension wall of the rear side wall of the recess part 130 and located above the recess part 130 (that is, the positioning part 140 is disposed in the +Z-axis direction of the recess part 130). The rear side wall is the side wall of the recess part 130, the extension wall of the rear side wall is flush with the rear side wall, and the extension wall of the rear side wall is located above the recess part 130. At least a portion of the positioning part 140 is located, relative to the chip 120, at a rear end side of the mounting direction (the second direction) in which the ink cartridge is mounted to the mounting part, that is, at least a portion of the positioning part 140 is located in the −Y-axis direction relative to the chip 120. The positioning part 140 is disposed at to rear end side in the Y-axis direction of the mounting direction of the first positioning surface 130*e* and the second positioning surface 130*f*.

In this way, when the ink cartridge 10 is mounted to the image forming device, the first positioning surface 130*e* and the second positioning surface 130*f* may first position the image forming device side terminal unit 210 in a left and right direction (the first direction), and then the positioning part 140 may position a position of the side terminal unit 210 of the image forming device in an up and down direction (the third direction), which can reliably realize the matching and positioning between the ink cartridge 10 and the mounting part of the image forming device. Furthermore, the reliability of the connection between the chip 120 and the ink outlet part 150 is further guaranteed.

Furthermore, the left side wall further has a first guiding surface 130*g*, which is connected to the first positioning surface 130*e*; the right side wall further has a second guiding surface 130*h*, which is connected to the second positioning surface 130*f*. When the ink cartridge 10 is mounted to the mounting part of the image forming device, the first guiding surface 130*g* and the second guiding surface 130*h* may guide the image forming device side terminal unit 210 to positions of the first positioning surface 130*e* and the second positioning surface 130*f*. This prevents hard contact between the ink cartridge 10 and the side terminal unit of the image forming device.

Continuing to refer to FIG. 2 and FIG. 3, the front housing 101 further has a second surface 130*a*, a third surface 130*b*, a through hole 113 and an open pore 114. The first surface 101*c* is located in the −Y-axis direction of the front surface 100*c* (that is, a rear end side of the mounting direction). The positioning part 140 is disposed on the cover plate 102, and the cover plate 102 is formed by protruding from a surface of the cover plate 102, and protrudes out of the first surface 101*c* after passing through the open pore 114 disposed on the front housing 101. Where the positioning part 140 is a bump along the Y-axis direction of the mounting direction. In addition, the positioning part 140 may also be a bump directly disposed on the first surface 101*c*, which can also achieve the beneficial effects of the present application.

The second surface 130*a* is disposed on the left side wall and is a top surface of the left side wall in the +Z-axis direction. The third surface 130*b* is disposed on the right side wall and is a top surface of the right side wall in the +Z-axis direction. The positioning part 140 is disposed in the +Z-axis direction of the second surface 130*a* and the third surface 130*b*, that is, the positioning part 140 is disposed above the second surface 130*a* and the third surface 130*b*. The positioning part 140 has a bottom surface 140*b*, a left surface 140*e* and a right surface 140*f*. The bottom surface 140*b* is a surface of the positioning part 140 in the −Z-axis direction, the left surface 140*e* is a surface of the positioning part 140 in the −X-axis direction, and the right surface 140*f* is a surface of the positioning part 140 in the +X-axis direction.

Specifically, the bottom surface 140*b* of the positioning part 140 is disposed to be inclined. Specifically, the bottom surface 140*b* of the positioning part 140 is disposed to be inclined relative to the Y-axis as the mounting direction, preferably, the bottom surface 140*b* of the positioning part 140 is increasingly inclined toward the −Z-axis side along the −Y-axis direction, that is, a thickness of an end of the positioning part 140 away from the rear side wall is less than a thickness of an end of the positioning part 140 close to the rear side wall.

Figure 4:
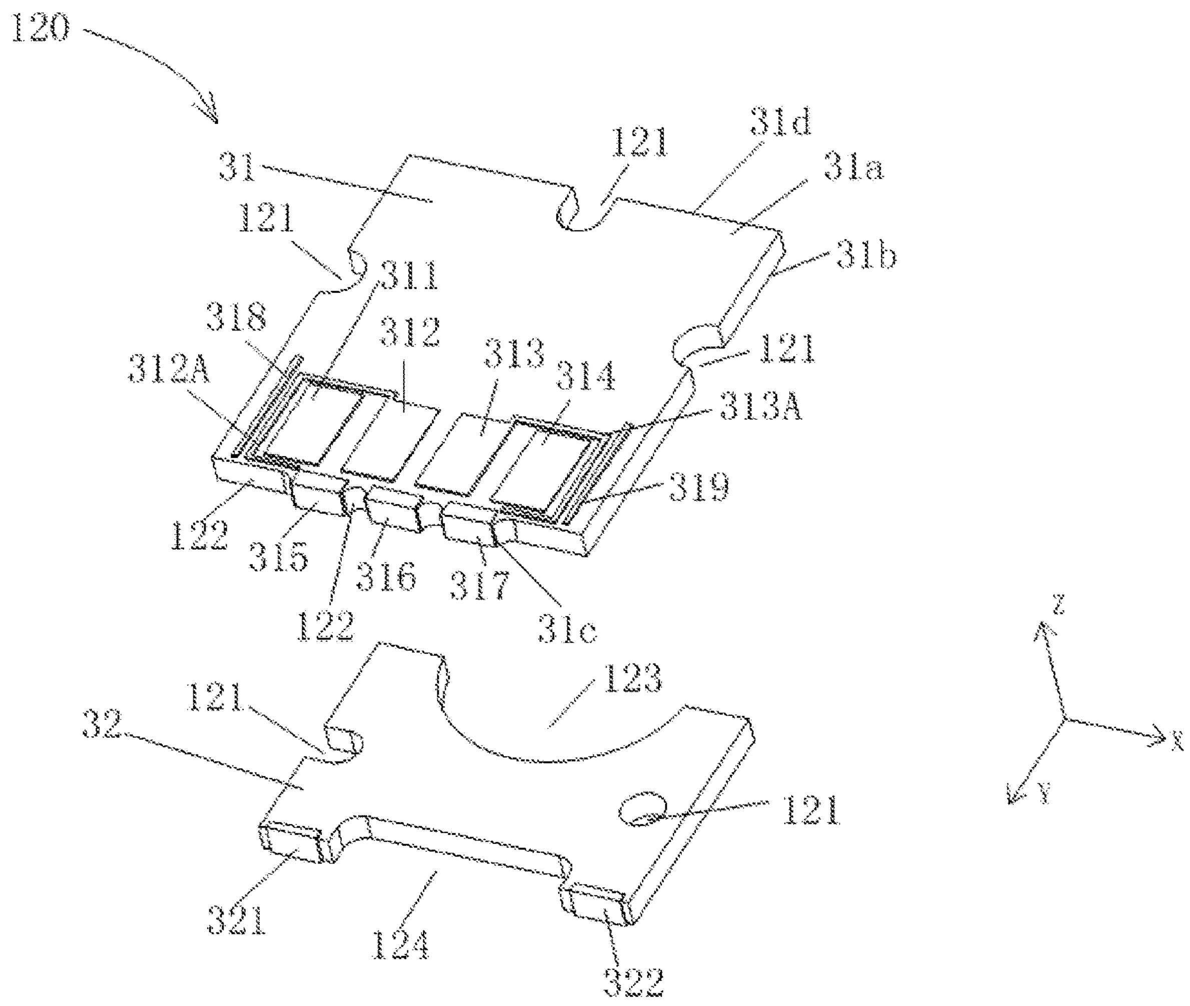
FIG. 4 is a schematic view of a chip according to Embodiment 1.

FIG. 4 is a schematic view of the chip according to Embodiment 1. The chip 120 includes a first substrate 31 and a second substrate 32. The first substrate 31 includes a first terminal, a first additional terminal 318, a second additional terminal 319, an extension terminal, a first hole 121 and a groove 122. The first substrate 31 is substantially in a cuboid shape and has six surfaces, which are a first side surface to a sixth side surface, respectively, where the first side surface 31*a* is disposed opposite to the second side surface 31*b*, the third side surface 31*c* is disposed opposite to the fourth side surface 31*d*, and the fifth side surface is disposed opposite to the sixth side surface. Some first terminals 311-314 are disposed on the first side surface 31*a*, and some other first terminals 315-317 are disposed at positions of the first side surface 31*a* and the third side surface 31*c* at the same time. The third side surface 31*c* is further provided with the grooves 122, which are spaced from some first terminals one by one. The first hole 121, a second hole 123 and a third hole 124 are through holes disposed on the chip. The first hole 121 is used for fixing the chip 120 to a chip holder or the ink cartridge 10. The second side surface 31*b* of the first substrate 31 is further provided with a wafer or an electrical element. The wafer is used for storing electronic information, for example, type of the ink cartridge, ink amount, type of ink, and so on. When the ink cartridge 10 is mounted to the mounting part 20, the chip 120 is in contact with a stylus part of a printer side terminal unit to form an electrical connection, and the storage information in the wafer and the information in the printer may be interacted, authenticated and maintained. For example, when the ink in the ink cartridge is continuously consumed, the ink amount information in the chip may be changed with the amount of printing.

The second substrate 32 includes a second terminal, a second hole 123, a first hole 121 and a third hole 124.

The second substrate 32, which is similar to the first substrate 31, is also substantially in a cuboid shape and has six side surfaces, which are a first side surface to a sixth side surface, respectively. The second terminal is disposed on positions of the first side surface and the third side surface of the second substrate 32 at the same time. The first hole 121 is used for fixing the chip 120 to the chip holder or the ink cartridge 10. The second hole 123 uses an avoidance position to avoid the wafer or the electrical element disposed on the first substrate 31. Of course, if necessary, the second substrate 32 may also be provided with a wafer or an electrical element. The second substrate 32 has a third hole 124 passes through the first side surface and the second side surface of the second substrate 32, specifically, a first high voltage terminal 321 is located on the −X-axis direction side of the third hole 124, and a second high voltage terminal 322 is located on the +X-axis direction side of the third hole 124.

The first terminal includes a wafer terminal connected with the wafer of the chip; the second terminal includes a high voltage terminal that receives a voltage (such as 42V) higher than that received by the wafer terminal; and the first terminal also includes a short circuit terminal for detecting whether a short circuit occurs between the terminals of the chip.

Further, the functions and effects of the terminals are as follows:

I. The wafer terminal:

reset terminal 312: for resetting internal data of the wafer, clock terminal 313: for receiving a clock signal, power supply terminal 315: for receiving a power potential (such as 3.6V) different from a ground potential, and providing a power for the wafer's operation through this terminal, ground terminal 316: for receiving the ground potential, data terminal 317: for transmitting or receiving a data signal.

II. The high voltage terminal:

the first high voltage terminal 321 and the second high voltage terminal 322: for receiving a mounting detection voltage (such as 42V) and completing the mounting detection function for the ink cartridge being mounted to the mounting part.

For example, a high resistance is connected between the first high voltage terminal 321 and the second high voltage terminal 322, and whether the ink cartridge has been mounted into the mounting part is determined by detecting the change of current or voltage.

III. The short circuit terminal:

first short circuit terminal 311 and second short circuit detection terminal 314: for detecting whether a short circuit occurs between the terminals, specifically, for detecting whether a short circuit occurs between the high voltage terminal and the short circuit terminal.

When there is a short circuit between the high voltage terminal and the short circuit terminal, it may be detected by the printer that the voltage on the short circuit terminal is increased, and the printer immediately prompts a short circuit message, which avoids the risk of damage to the chip or the printer due to the short circuit.

IV. Additional terminal:

Neither the first additional terminal 318 nor the second additional terminal 319 contacts with the stylus part and is electrically connected with the stylus part, and they may have other function, such as enhancing the short circuit detection function, and detecting whether there is ink attachment on the substrate.

V. The extension terminal:

A first extension terminal 312A is an extension portion of the reset terminal 312, and a second extension terminal 313A is an extension portion of the clock terminal 313.

Some of the terminals of the chip 120 (specifically, some of the short circuit terminals, wafer terminals and high voltage terminals) are disposed parallel to the Y-axis direction of the mounting direction, and some of the terminals (specifically, some of the wafer terminals and the high voltage terminals) are disposed perpendicular to the Y-axis direction of the mounting direction.

Figure 5:
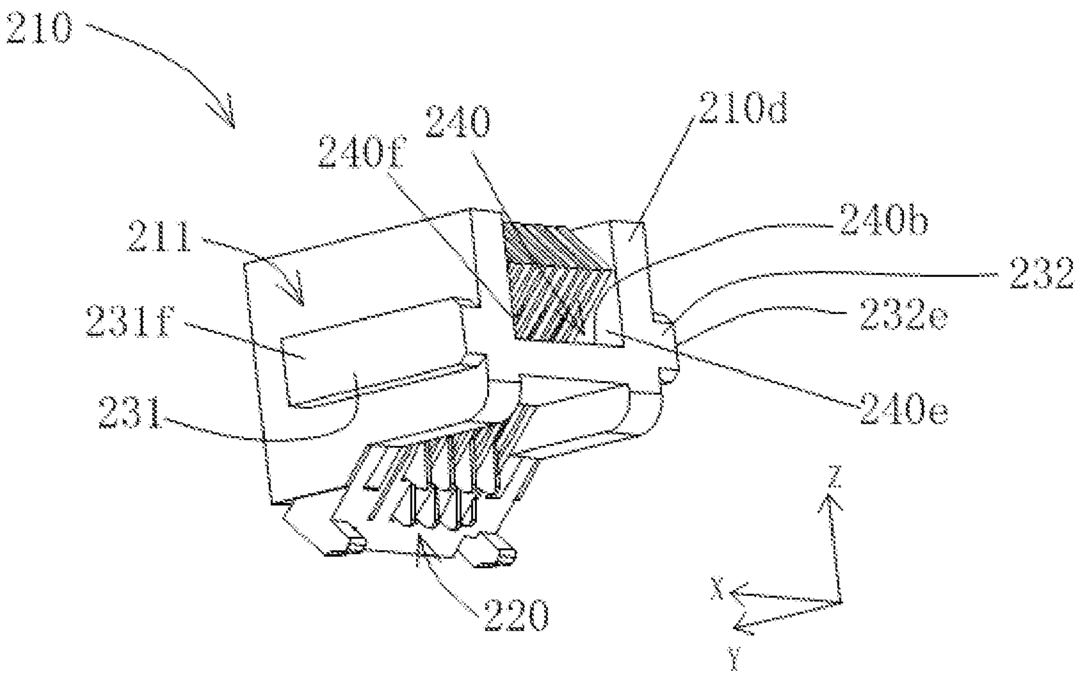
FIG. 5 is a schematic view of an image forming device side terminal unit of a mounting part according to Embodiment 1.
Figure 6:
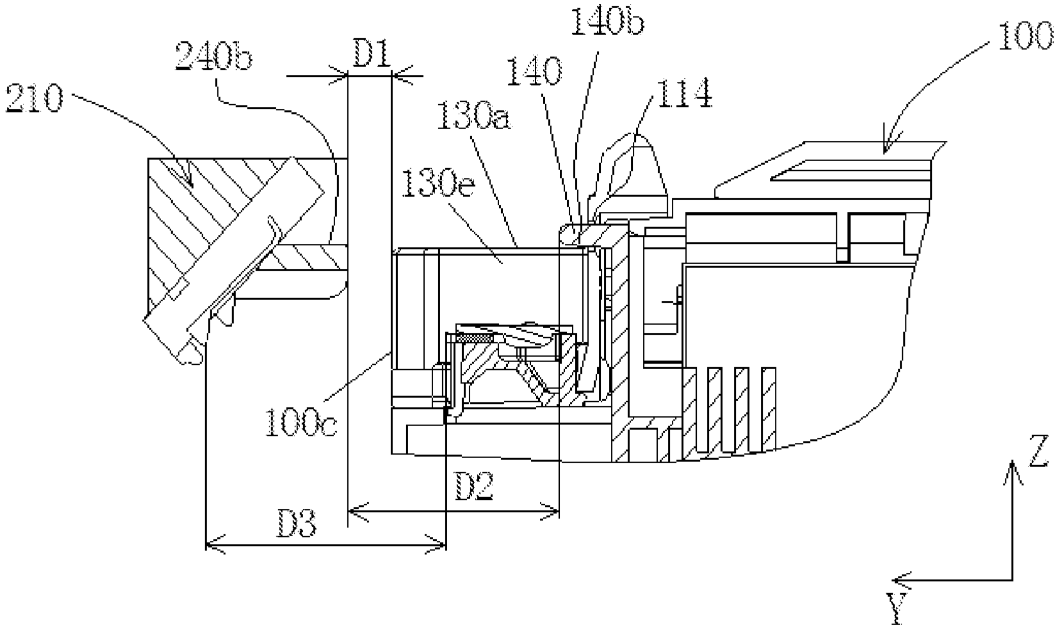
FIG. 6 is a partial cross-sectional view of the ink cartridge to be mounted to the mounting part according to Embodiment 1.

Referring to FIG. 5 and FIG. 6, FIG. 5 is a schematic view of an image forming device side terminal unit of the mounting part according to Embodiment 1; FIG. 6 is a partial cross-sectional view of the ink cartridge 10 to be mounted to the mounting part according to Embodiment 1. The image forming device side terminal unit 210 of the mounting part includes a frame 211, a stylus assembly 220, a first protruding part 231 and a second protruding part 232. The frame 211 is a main part of the image forming device side terminal unit 210, the stylus assembly 220 is disposed on the frame 211, there is a space 240 between the frame 211 and the stylus assembly 220, and the first protruding part 231 and the second protruding part 232 are disposed on two opposite side surfaces of the frame 211. Specifically, the first protruding part 231 is formed by protruding from a right side surface of the frame 211, the first protruding part 231 has a first plane 231*f* in the +X-axis direction; and the second protruding part 232 is formed by protruding from the left side surface of the frame 211, and the second protruding part 232 has a second plane 232*e* in the −X-axis direction. The stylus assembly 220 is disposed inclined relative to the Y-axis as the mounting direction, and the space 240 is a space formed between the interior of the frame 211 and the stylus assembly 220 and having an opening in the −Y-axis direction. A surface of the image forming device side terminal unit 210 in the −Y-axis direction is a third plane 210*d*. The front surface 100*c* of the cartridge body 100 is the end of the first guiding surface 130*g* and the second guiding surface 130*h* in the +Y-axis side. The first guiding surface 130*g* and the second guiding surface 130*h* are located at the opening of the recess part 130. The space 240 has a space bottom surface 240*b*, a space left side surface 240*e* and a space right side surface 240*f*. The space bottom surface 240*b* is provided in the −Z-axis direction of the space 240. In general, the space bottom surface 240*b* is parallel to an XY plane, optionally, and the space bottom surface 240*b* may also be inclined with respect to the XY plane. The space left side surface 240*e* and the space right side surface 240*f* are disposed opposite to each other in the X-axis.

When the ink cartridge 10 is mounted to the mounting part of the image forming device, the chip 120 abuts against a stylus of the stylus assembly 220; the bottom surface 140*b* of the positioning part 140 matches with the space bottom surface 240*b*; the left surface 140*e* matches with the space left side surface 240*e*; the right surface 140*f* matches with the space right side surface 240*f*; the first positioning surface 130*e* matches with (abuts against) the second plane 232*e*; the second positioning surface 130*f* matches with (abuts against) the first plane 231*f*. The bottom surface 140*b* disposed inclined can play a guiding role in the mounting process to facilitate better positioning between the positioning unit 140 and the space 240. The image forming device side terminal unit 210 has a certain floating space in a three-dimensional space before the ink cartridge 10 is mounted to the mounting part of the image forming device, so it is very important for how the ink cartridge 10 is correctly and reliably mounted to the mounting part of the image forming device.

With reference to FIG. 6, in the process that the ink cartridge 10 is mounted to the mounting part of the image forming device along the Y-axis direction, under the posture shown in FIG. 6, when the front surface 100*c* of the cartridge body 100 has not yet reached a position of a part at the +Y-axis side of the mounting part of the image forming device, a distance between ends of the front surface 100*c*, the first guiding surface 130*g* and the second guiding surface 130*h* at the +Y-axis side and the third plane 210*d* is D1, a distance between an end of the positioning part 140 at the +Y-axis side and an end of the space 240 at −Y-axis side is D2, and a distance between a terminal of the chip and the stylus is D3. In general, it is D1<D2<D3. In this way, the first guiding surface 130*g* and the second guiding surface 130*h* first position the image forming device side terminal unit 210 in the X-axis direction (that is, the left and right direction), then the positioning part 140 positions the image forming device side terminal unit 210 in the Z-axis direction (that is, the up and down direction), and finally the terminal of the chip abuts against the stylus, which can reliably realize the matching and positioning between the ink cartridge 10 and the mounting part of the image forming device, and further ensures the reliability of the connection between the chip 120 and the stylus, and the connection between the ink outlet and the ink supply part of the mounting part. Further, the above dimension may also be D1<D2 and D1<D3, but dimensions of D2 and D3 have no direct relationship in length. In this way, the first positioning surface 130*e* and the second positioning surface 130*f* may first position the image forming device side terminal unit 210 in the left and right direction, and then the positioning part 140 may position the image forming device side terminal unit 210 in the up and down position, which can also ensure that the ink cartridge 10 is reliably mounted into the mounting part of the image forming device.

Embodiment 2

Figure 7:
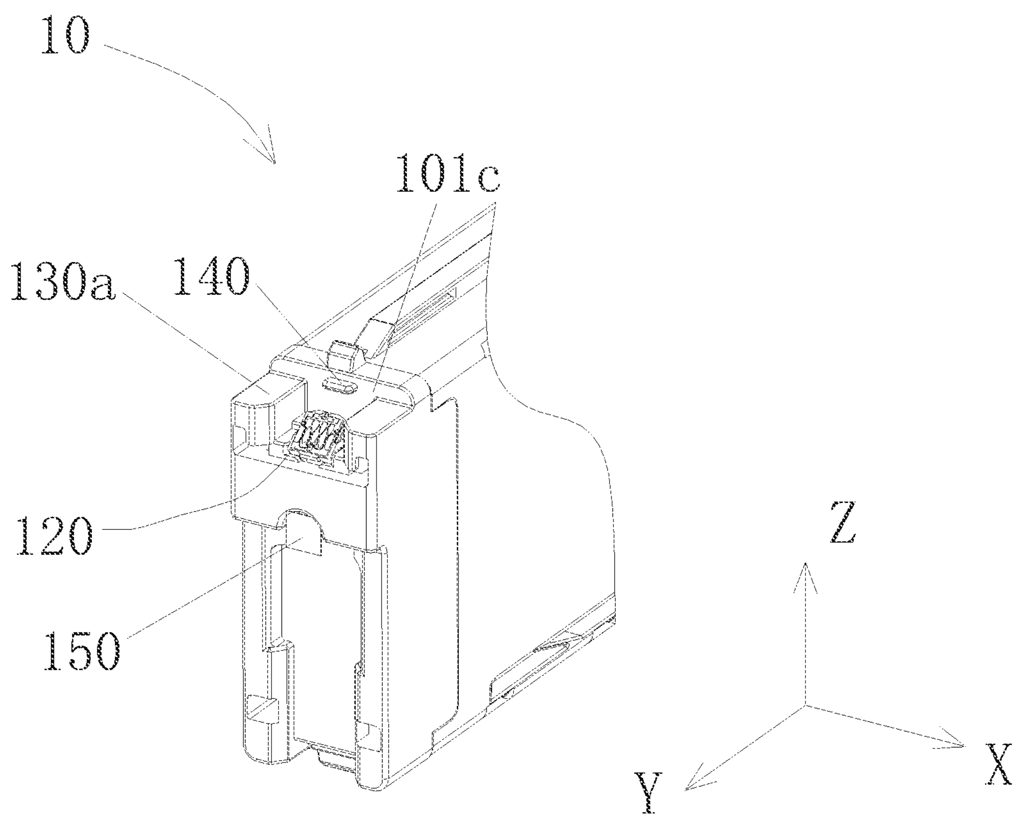
FIG. 7 is a schematic view of an ink cartridge according to Embodiment 2.

On the basis of Embodiment 1, the present application also discloses another specific implementation. With reference to FIG. 7, a difference between this embodiment and Embodiment 1 is that the chip 120 is disposed inclined relative to the cartridge body 100, and its inclination manner is consistent with that of the stylus assembly 220. The inclination manner of the chip 120 is to be inclined toward the +Z-axis direction along the −Y-axis direction. The terminal on the chip 120 is disposed inclined on the chip 120. The positioning part 140 of the ink cartridge 10 is disposed directly on the first surface 101*c*.

At least a portion of the first positioning surface 130*e* and at least a portion of the second positioning surface 130*f* are disposed above the terminal of chip 120 (that is, disposed in the +Z-axis direction of the terminal).

Embodiment 3

Figure 8:
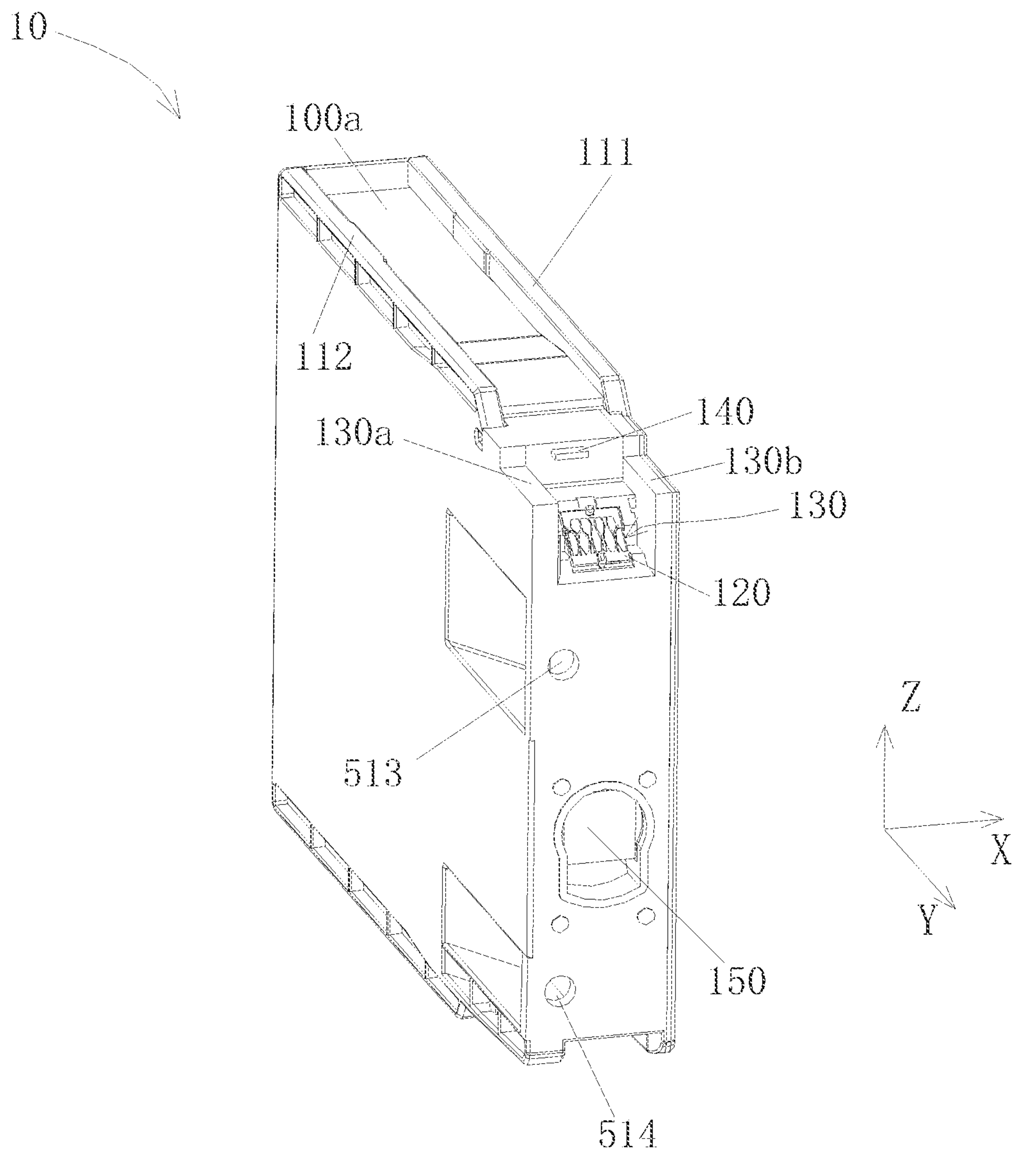
FIG. 8 is a schematic view of an ink cartridge according to Embodiment 3.

On the basis of Embodiment 1, the present application also discloses another specific implementation. Referring to FIG. 8, an ink cartridge 10 includes a cartridge body 100, a fixing mechanism, a positioning part 140 and a chip 120. The cartridge body 100 has an upper surface 100*a*, a lower surface 100*b*, a first positioning hole 513, a second positioning hole 514 and an ink outlet 150*a*. The fixing mechanism is disposed on the upper surface 100*a* and the lower surface 100*b*, and is used for fixing the ink cartridge 10 when the ink cartridge 10 is mounted to a mounting part of an image forming device. The fixing mechanism includes a first fixing part 111 and a second fixing part 112, both of which are respectively located on a +X-axis side and a −X-axis side of the upper surface 100*a* and the lower surface 100*b*. The first positioning hole 513 and the second positioning hole 514 are holes disposed on the front surface 100*c* of the cartridge body 100, and may match with a positioning pillar in the mounting part of the image forming device to define the position relationship between the ink cartridge 10 and the mounting part of the image forming device. The chip 120 of the ink cartridge 10 is disposed inclined on the cartridge body 100, and its inclination manner is consistent with that of the stylus assembly 220. The chip 120 is disposed inclined, and the inclination manner of the chip 120 is to be inclined toward the +Z-axis direction along the −Y-axis direction. A terminal on the chip 120 is disposed inclined on the chip 120. At least a portion of the first positioning surface 130*e* and at least a portion of the second positioning surface 130*f* are disposed above the terminal of the chip 120 (that is, disposed in a +Z-axis direction of the terminal). A housing of the cartridge body 100 is formed by mounting of two housings.

In this embodiment, the fixing mechanism is disposed on both the upper surface 100*a* and the lower surface 100*b*, and it may be understood that in other embodiments, the fixing mechanism may only be disposed on the upper surface 100*a* or the lower surface 100*b*.

In a process of mounting the ink cartridge 10 to the mounting part of the image forming device, the positioning pillar in the mounting part of the image forming device first enters the first positioning hole 513 and the second positioning hole 514; then, an image forming device side terminal unit 210 begins to enter the recess part 130 to position a position between the ink cartridge 10 and the mounting part in the X-axis direction; then, the positioning part 140 may position the image forming device side terminal unit 210 in the Z-axis direction (that is, the up and down direction), and finally the terminal of chip abuts against the stylus, so that the matching and positioning between the ink cartridge and the mounting part of the image forming device can be reliably realized, the reliability of the connection between the chip 120 and the stylus, and between the ink outlet and the ink supply part of the mounting part can be further ensured.

Embodiment 4

Figure 9:
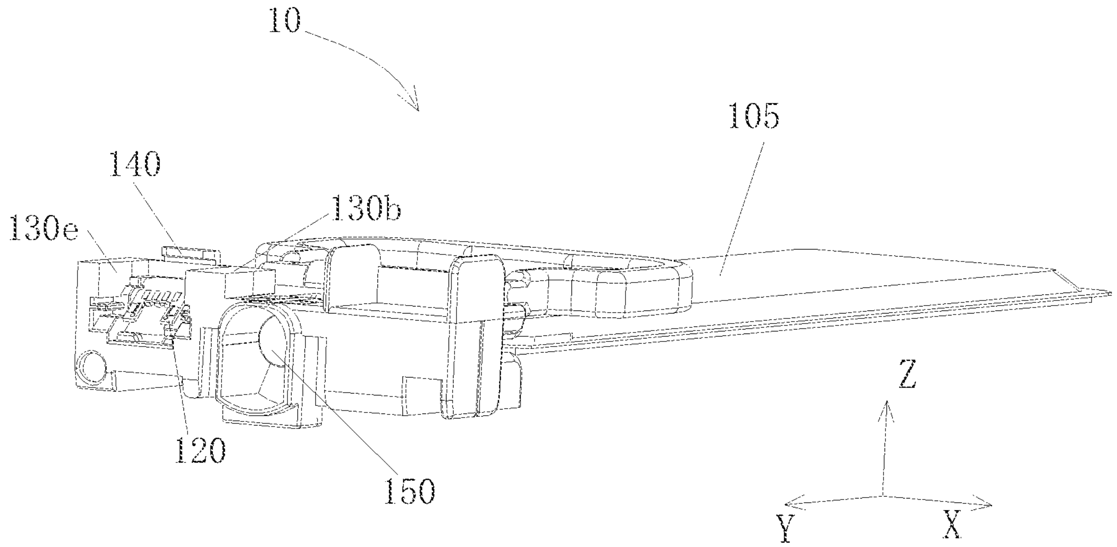
FIG. 9 is a schematic view of an ink cartridge according to Embodiment 4.

On the basis of Embodiment 1, the present application also discloses another specific implementation. With reference to FIG. 9, an ink cartridge 10 includes a cartridge body 100, which includes a base and an ink bag 105 (an ink accommodating part). In this embodiment, a portion of the ink bag 105 (the ink accommodating part) is disposed in the base and the other portion thereof is disposed outside the base; that is, a portion of the ink bag 105 is directly exposed to the outside. The outline of the cartridge body 100 is composed of the base and the ink bag 105.

A portion of the ink bag 105 of the ink cartridge 10 is disposed on the base where the recess part 130 is located and is not placed in the housing described in Embodiment 1. The ink cartridge 10 is still mounted into the mounting part along the Y-axis direction. In order to better realize the mounting, the ink cartridge 10 may be first placed in a bearing frame, and then the ink cartridge 10 and the bearing frame may be mounted into the mounting part of the image forming device by pressing a −Y-axis side of the bearing frame.

The chip 120 of the ink cartridge 10 is disposed inclined on the cartridge body 100, and the inclination manner thereof is consistent with that of the stylus assembly 220. However, its shape is different from that of the chip 120 of Embodiment 2, but both may finish abutting against the stylus and finish the electrical connection with the image forming device. The positioning part 140 is an L-shaped bump extending from an overall surface formed by the second surface 130*a* and the third surface 130*b*. This structure can still achieve the beneficial effect of this embodiment.

Embodiment 5

Figure 10:
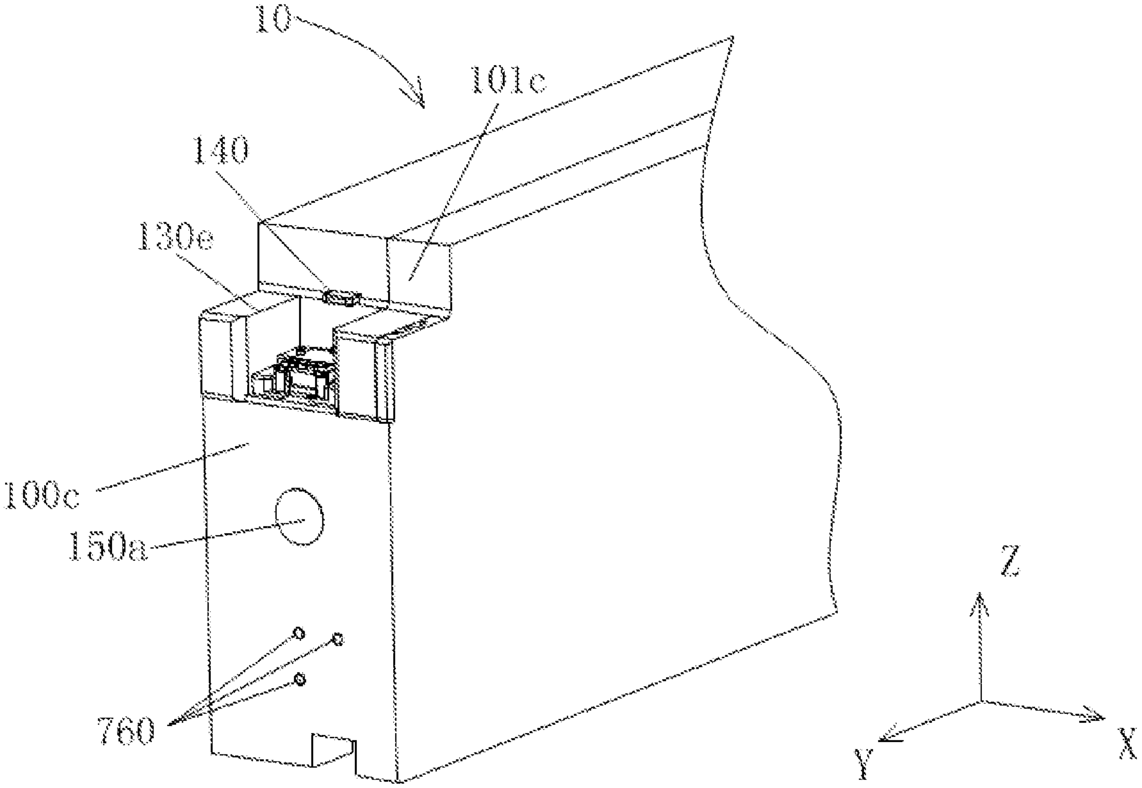
FIG. 10 is a schematic view of an ink cartridge according to Embodiment 5.

On the basis of Embodiment 1, the present application also discloses another specific implementation, as shown in FIG. 10. An ink outlet 150*a* and a pressurizing port 760 are disposed on a front surface 100*c* of an ink cartridge 10. The number of the pressurizing port 760 may be one or more. In this embodiment, the number of the pressurizing port 760 is 3, and they may apply pressure to different parts of the ink cartridge 10, for example, to the sealed housing and a sealed airbag. The pressurized air may be used to squeeze the ink bag to provide ink according to the printing demand, and may also stir the ink in the ink bag to prevent its uneven concentration.

The height in the Z-axis direction of the first surface 101*c* of this embodiment is larger than that of the Embodiments 1 to Embodiment 4. The positioning part 140 is disposed on the first surface 101*c*, and the first surface 101*c* may be an inclined surface, a curved surface or a surface in other shape.

Embodiment 6

Figure 11:
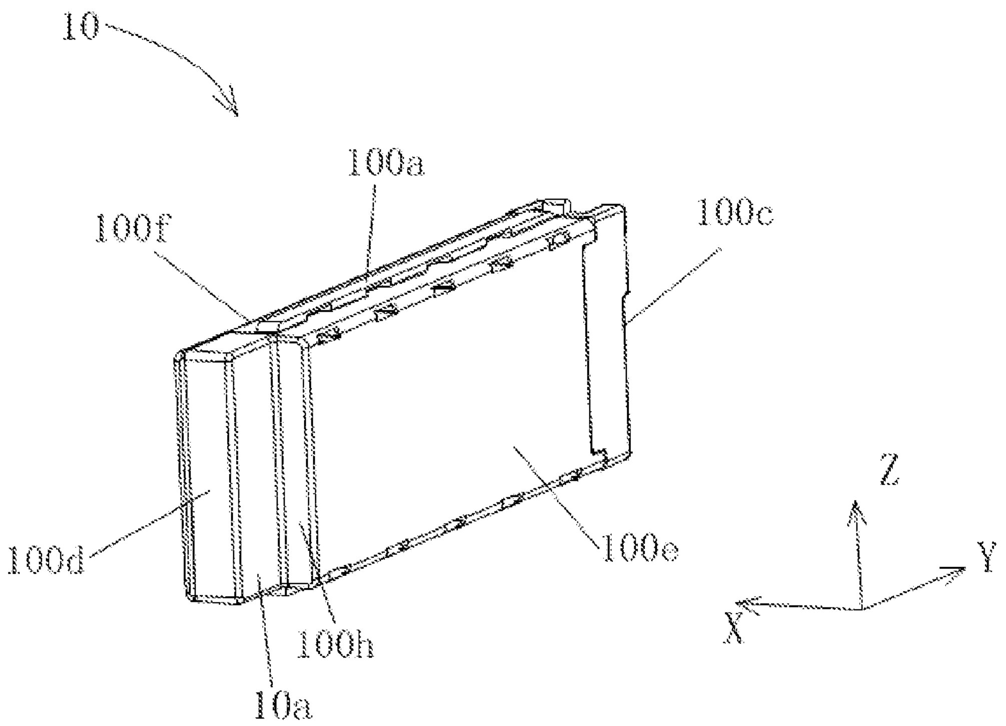
FIG. 11 is a schematic view of one kind of ink cartridge according to Embodiment 6.
Figure 12:
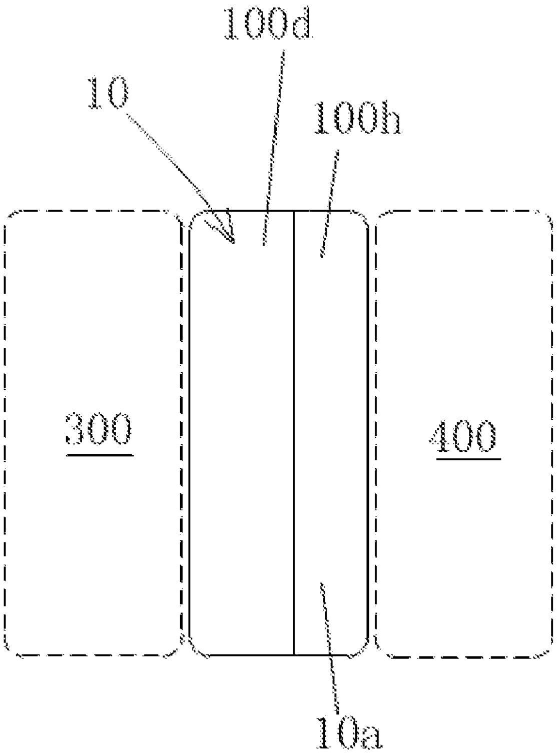
FIG. 12 is a schematic view of a plurality of ink cartridges according to Embodiment 6.
Figure 13:
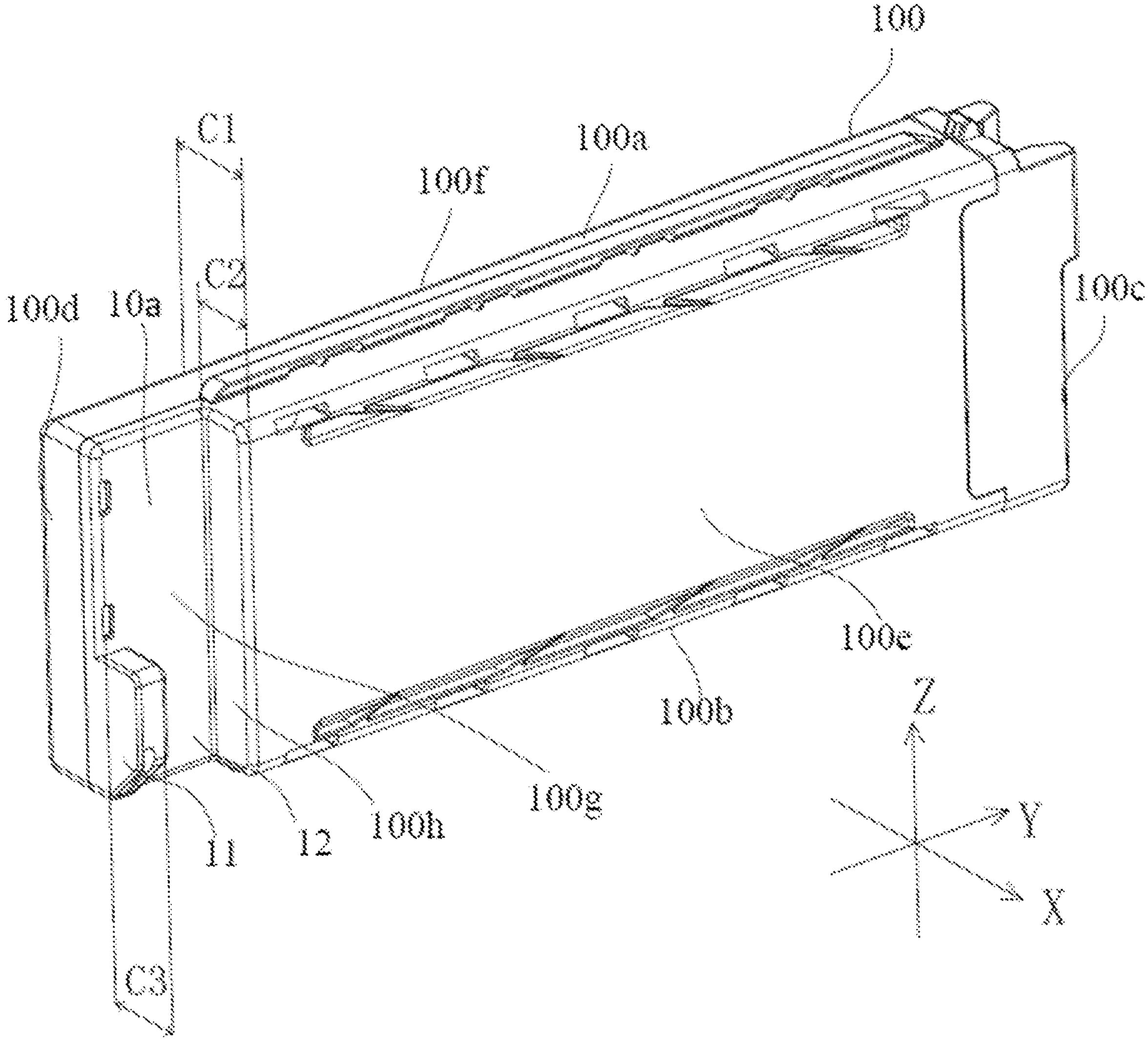
FIG. 13 is a schematic view of another ink cartridge according to Embodiment 6.
Figure 14:
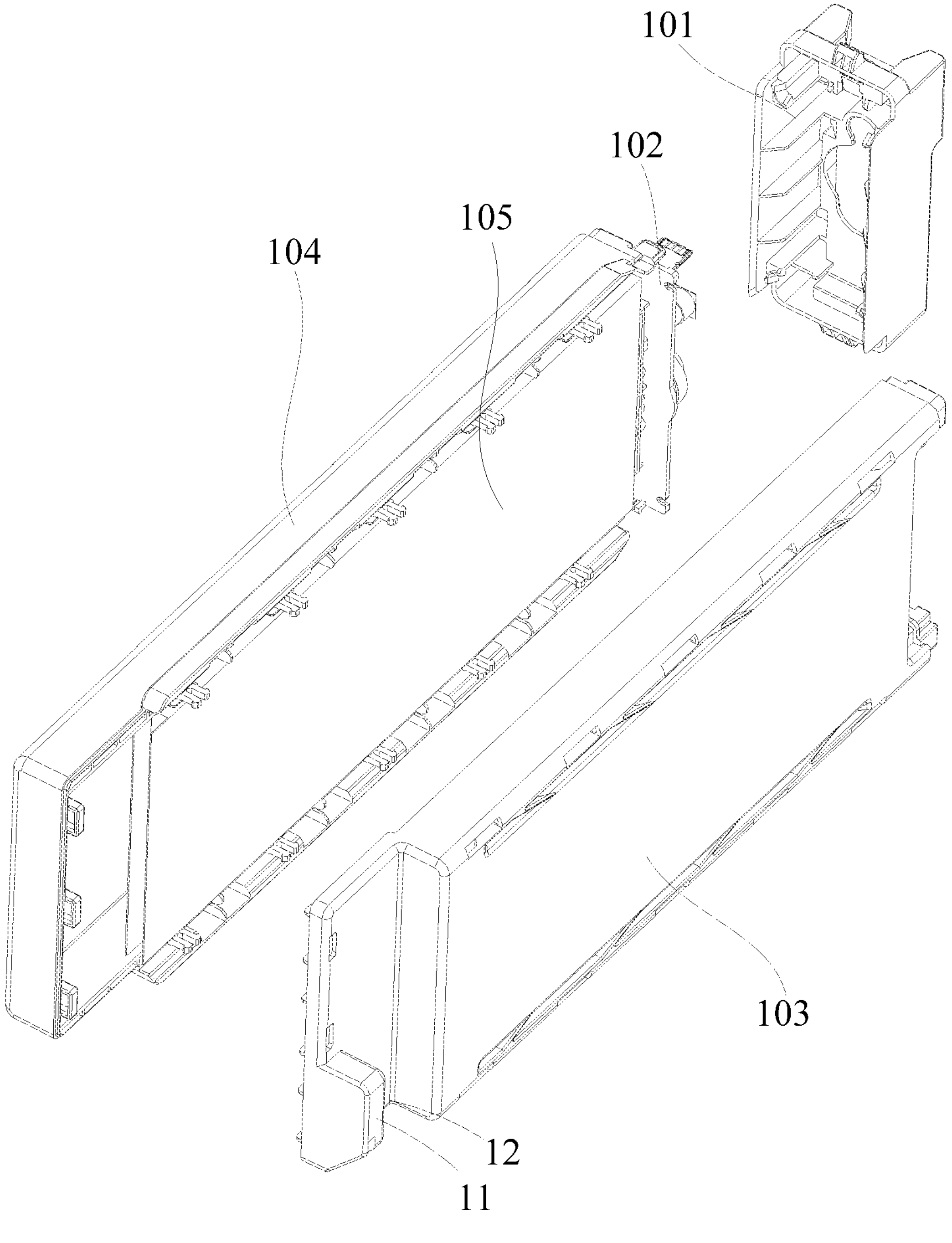
FIG. 14 is an exploded schematic view of the ink cartridge of FIG. 13.
Figure 15:
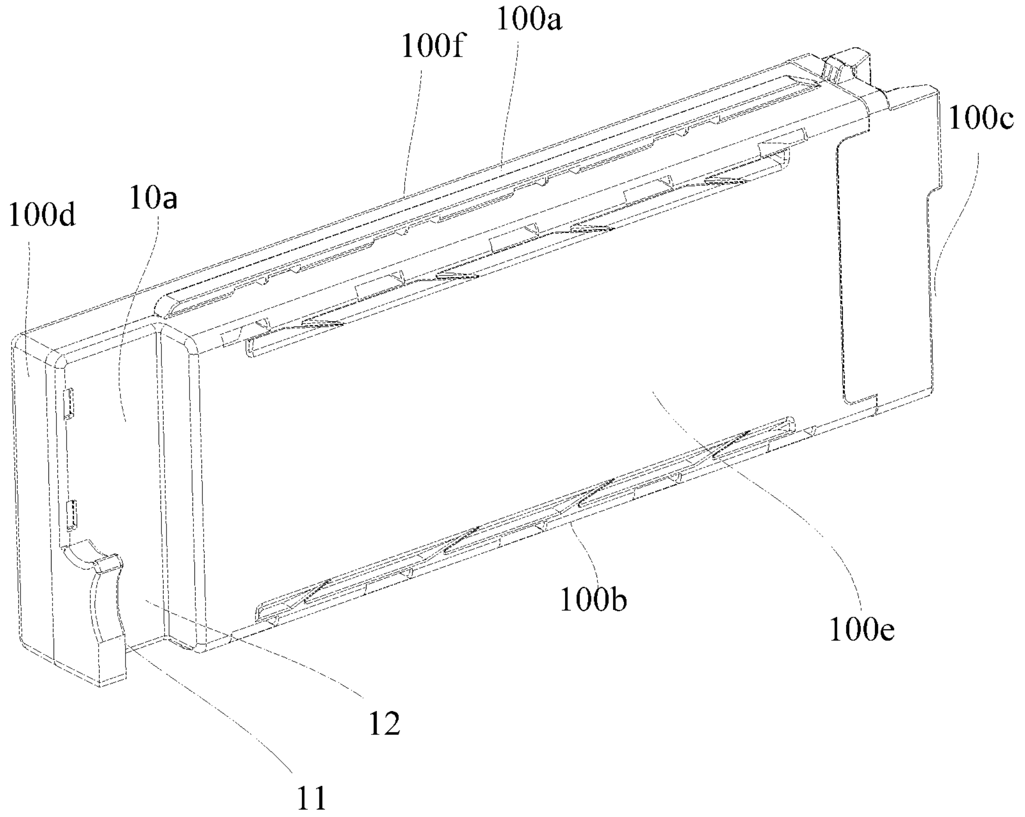
FIG. 15 is a schematic view of another variant of the ink cartridge of FIG. 13.

FIG. 11 is a schematic view of one ink cartridge according to Embodiment 6; FIG. 12 is a schematic view of a plurality of ink cartridges according to Embodiment 6; FIG. 13 is schematic view of another ink cartridge according to Embodiment 6; FIG. 14 is an exploded schematic view of the ink cartridge of FIG. 13; FIG. 15 is a schematic view of another variant of the ink cartridge of FIG. 13.

As shown in FIG. 11, a rear surface 100*d* of the ink cartridge is disposed opposite to a front surface 100*c*. A notch 10*a* is in an L-shape, and a transition surface 100*h* is a portion of the notch 10*a* in the +Y-axis side. When the ink cartridge 10 is mounted to the mounting part, a mounting schematic view of it with a first ink cartridge 300 and a second ink cartridge 400 is as shown in FIG. 12, and when the multiple ink cartridges are observed along the Y-axis as the mounting direction, the ink cartridge 10 in FIG. 11 is located between the first ink cartridge 300 and the second ink cartridge 400. If rear sides of the first ink cartridge 300 and the second ink cartridge 400 have a different shape from a rear side of the ink cartridge 10, for example, the rear sides of the first ink cartridge 300 and the second ink cartridge 400 do not have a notch 10*a*, that is, their rear surfaces are a surface with no notch, and if so disposed, the user's hand cannot be inserted between a right surface 100*f* and the notch 10*a* of the ink cartridge 10 due to the blocking of the rear surface of the first ink cartridge 300, and thus the user cannot remove the ink cartridge 10 from the mounting part.

An ink cartridge invented in the present application is shown in FIGS. 13-14. The ink cartridge includes a cartridge body 100. The cartridge body 100 has a front end and a rear end in a mounting direction, and the cartridge body 100 includes a front surface 100*c*, a rear surface 100*d*, a left surface 100*e*, a right surface 100*f*, an upper surface 100*a* and a lower surface 100*b*; the left surface 100*e* and the right surface 100*f* extend along the mounting direction, and at least one of the left surface 100*e* and the right surface 100*f* is provided with a notch 10*a* perpendicular to the mounting direction at the rear end. At least a portion of the notch 10*a* runs through the upper surface 100*a* and the lower surface 100*b* of the cartridge body, and the notch 10*a* includes a step surface 100*g* extending in the mounting direction and a transition surface 100*h* between the first surface and the step surface 100*g*; the step surface 100*g* is provided with a rear bump 11 extending from bottom to the top, and there is a gap 12 between the rear bump 11 and the transition surface 100*h*; an avoidance space extending to the upper surface 100*a* of the cartridge body is disposed above the rear bump 11.

Where the mounting direction is the +Y-axis direction.

The transition surface 100*h* may be parallel to the rear surface 100*d*, or not parallel to the rear surface 100*d*, and no specific setting is made here.

The first surface may be the left surface 100*e* or the right surface 100*f*, and no specific setting is made here.

The step surface 100*g* may be perpendicular to the transition surface 100*h* or not perpendicular to the transition surface 100*h*, and no specific setting is made here.

Preferably, a top surface of the rear bump 11 does not exceed the midline from the upper surface 100*a* to the lower surface 100*b* of the cartridge body. In other implementations the top surface of the rear bump 11 may exceed the midline from the upper surface 100*a* to the lower surface 100*b* of the cartridge body 100. Preferably the top surface of the rear bump 11 is disposed below the midline from the upper surface 100*a* to the lower surface 100*b* of the cartridge body 100.

The ink cartridge 10 shown in FIG. 13 can solve the problem that the ink cartridge 10 cannot be removed from the mounting part. As shown in FIG. 13, the rear end (the −Y-axis side) of the ink cartridge 10 has the notch 10*a*, the rear bump 11, and the gap 12. When the cartridge 10 needs to be removed, the user's finger is inserted in the −Z-axis direction into the gap 12 between the rear bump 11 and the transition surface 100*h*, and then apply force toward the −Y-axis side to pull the ink cartridge 10 out of the mounting part.

It should be noted that after pulling the ink cartridge 10 out of the mounting part for a certain distance, a plurality of fingers may be inserted in the X-axis direction into the gap 12, and then remove the ink cartridge 10 as a whole from the mounting part, thereby completing the operation of removing the ink cartridge. At this time, by grasping the rear bump 11 with a plurality of fingers, the ink cartridge 10 can be prevented from falling off after leaving the mounting part.

It should also be noted that the step surface 100*g* may be parallel to the mounting direction or inclined relative to the mounting direction, and no specific setting is made in the present application.

The rest is the same as Embodiment 1.

Optionally, the gap 12 is provided with an opening in at least first and second directions perpendicular to the mounting direction.

Where the first direction is a direction of the bottom surface pointing to the top surface, and the second direction is a direction of the right surface pointing to the left surface.

In an optional implementation, the first direction is the +Z direction and the second direction is the +X direction.

Optionally, the top surface of the rear bump 11 is an arc surface recessed downward, as shown in FIG. 15.

Where for the ink cartridge 10 with a large weight, if the top surface of the rear bump 11 is horizontal surface, when removing the ink cartridge 10 from the mounting part by using the finger, it is not easy for the finger to find a point of strength due to the overweight of the ink cartridge 10. Therefore, setting the top surface of the rear bump 11 as a curved surface can alleviate the problem that the finger is unable to work due to the overweight of the ink cartridge.

Optionally, the side surface of the rear bump 11 extending toward the mounting direction is an arc surface recessed toward a direction of the step surface 100*g*, as shown in FIG. 15.

Since the ink cartridge 10 is pulled out of the mounting part for a certain distance, the ink cartridge may be better removed through a plurality of fingers inserting into the gap 12 in the X-axis direction.

The design of this structure can also prevent that, for a large ink cartridge, when the ink cartridge is removed by using only the fingers to go deep into the recess part and then pulling it out, the overweight of the ink cartridge cause the fingers to be pressed and painful. Furthermore, this can also prevent that since the rear surface of the ink cartridge is relative small, and the gap between the ink cartridges is small, when a plurality of fingers are inserted into a side pulling part, sometimes the fingers cannot be well inserted into the corresponding position, which causes that the ink cartridge cannot be removed.

In an optional implementation, a distance between the right surface 100*f* and the left surface 100*e* is C1, a distance between the left surface 100*e* and the step surface 100*g* is C2, and a distance between the side surface of the rear bump 11 and the step surface 100*g* is C3, and C2 is greater than or equal to C3. Preferably, it is that C1=40 mm, C2=15.5 mm, and C3=15.5 mm.

Optionally, in order to improve the overall aesthetics of the ink cartridge 10, the rear surface of the rear bump 11 is coplanar with the rear surface 100*d* of the cartridge body, and the bottom surface of the rear bump 11 is coplanar with the lower surface 100*b* of the cartridge body.

Optionally, as shown in FIG. 14, in order to facilitate the replacement of the ink or the ink bag, the cartridge body 100 includes a front housing 101, a left housing 103, and a right housing 104, where the left housing 103 and the right housing 104 are disposed opposite to each other and clamped with each other, the front housing 101 is located at front ends of the left housing 103 and the right housing 104 and is clamped with the front ends of the left housing 103 and the right housing 104.

Where the left housing 103 and the right housing 104 surround to form an accommodating part for accommodating ink.

In order to facilitate the observation of ink injection in the ink bag 105, a window for observing the ink injection is disposed on the left housing 103.

The rear bump 11 may be disposed at the rear end of the left housing 103 or at the rear end of the right housing 104, and no specific setting is made here.

Embodiment 7

Figure 16:
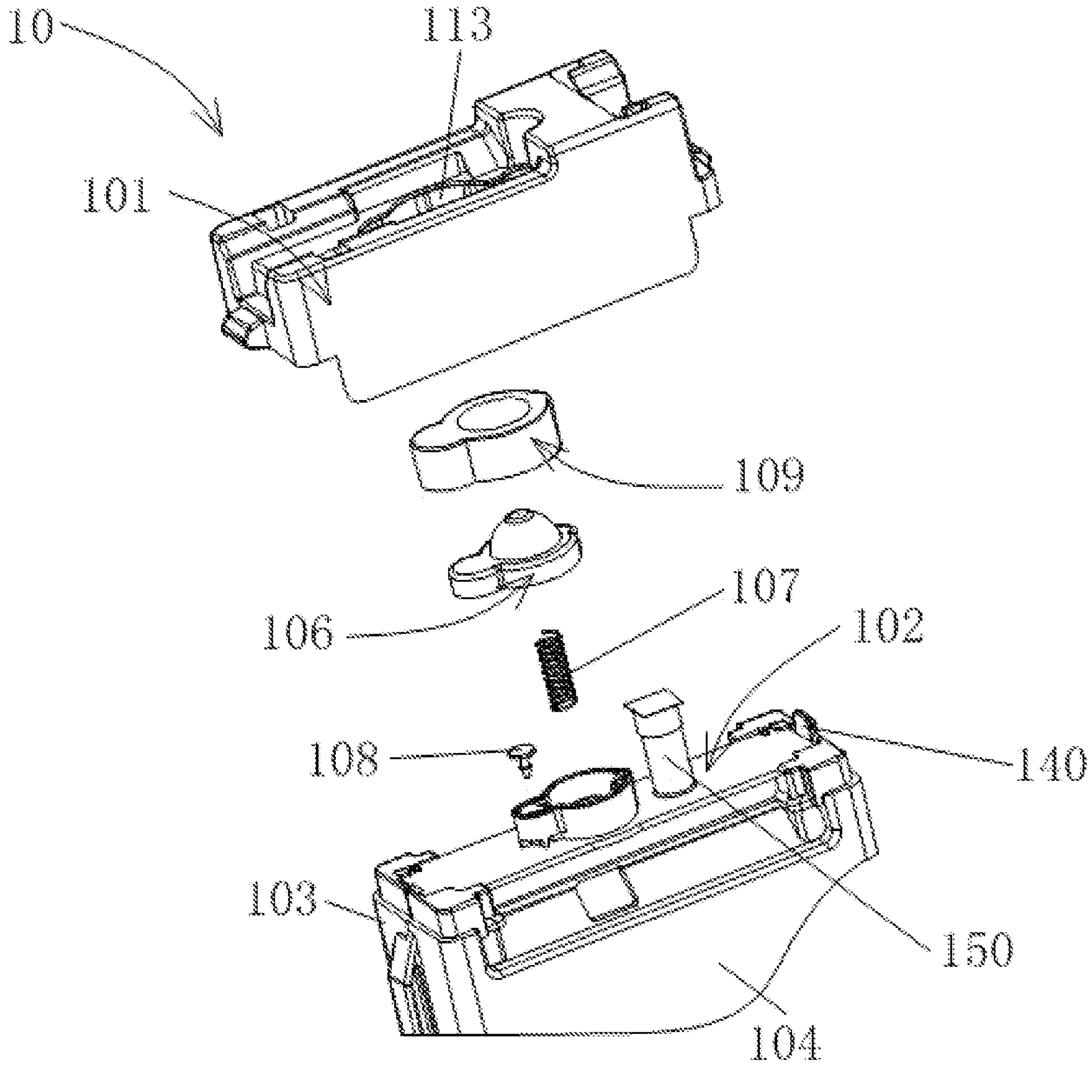
FIG. 16 is a partial exploded schematic view of an ink cartridge according to Embodiment 7.
Figure 17:
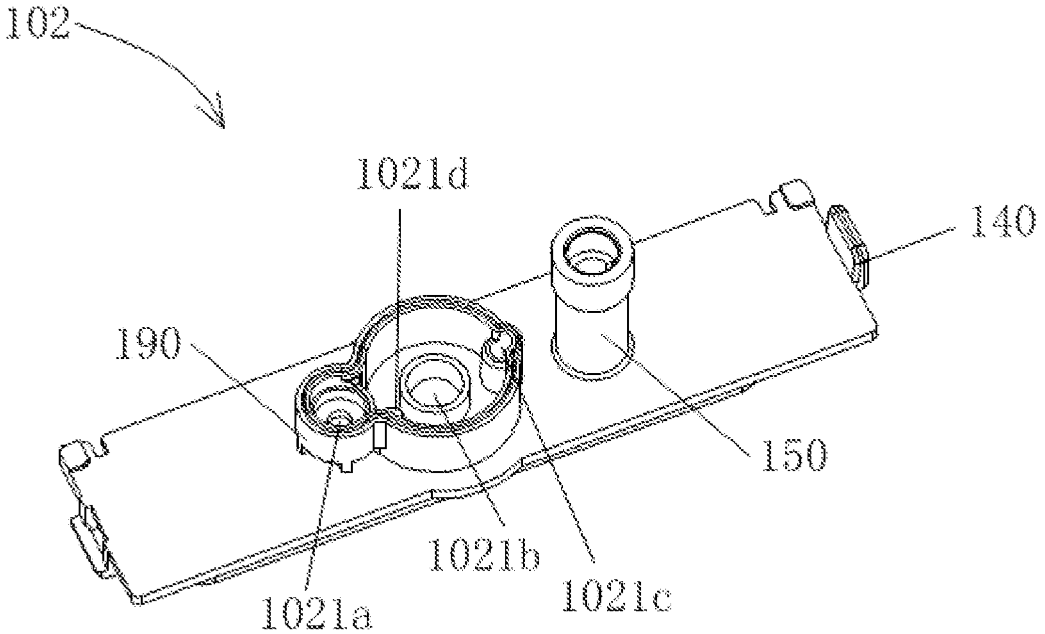
FIG. 17 is a schematic view of a cover plate according to Embodiment 7.
Figure 18:
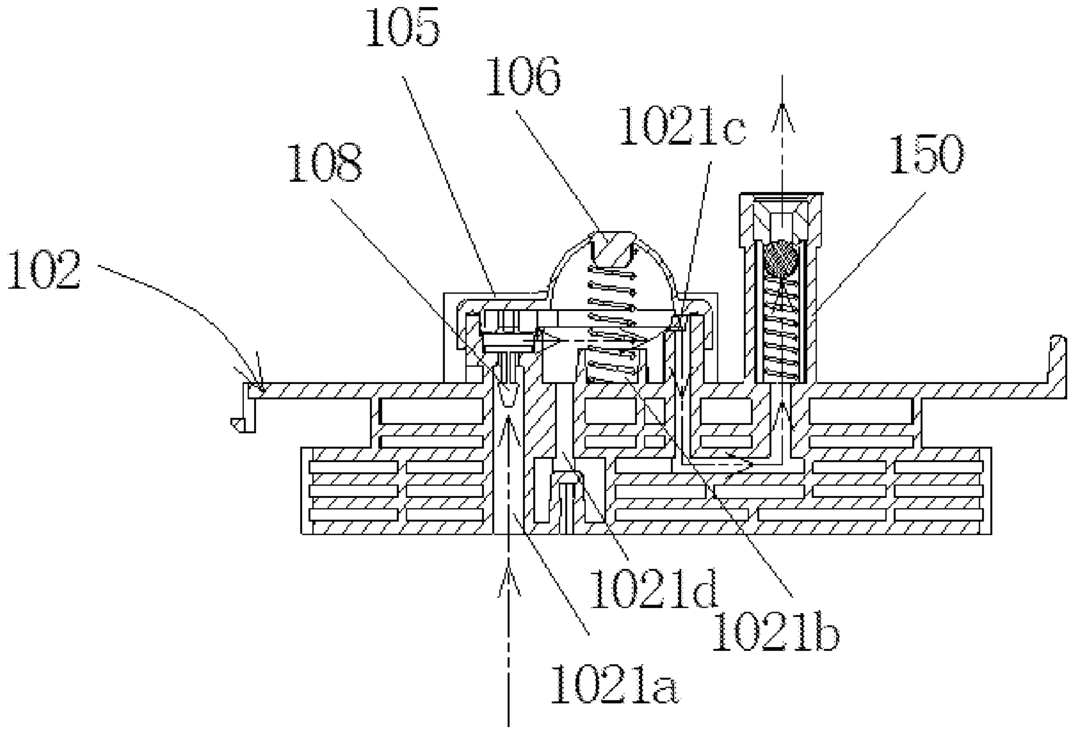
FIG. 18 is a partial cross-sectional view of the ink cartridge according to Embodiment 7.

FIG. 16 is a partial exploded schematic view of an ink cartridge according to Embodiment 7. FIG. 17 is a schematic view of a cover plate according to Embodiment 7. FIG. 18 is a partial cross-sectional view of the ink cartridge according to Embodiment 7.

With reference to FIG. 16-FIG. 18, the present application also discloses another specific implementation, and with reference to FIG. 16, an ink cartridge 10 has a front housing 101, a cover plate 102, a left housing 103, a right housing 104, a fixing cap 109, an elastic cap 106, an elastic element 107 and a rubber plug 108. The elastic element 107 is preferably a spring. The positioning part 140, the ink outlet part 150 and a detection bump 190 are each disposed on the cover plate 102, the ink outlet part 150 has an ink outlet, and the detection bump 190 is a bump extending from the cover plate 102. An one-way valve hole 1021*a*, an elastic element hole 1021*b*, a communication hole 1021*c* and an ink injection hole 1021*d* are provided in the detection bump 190. During mounting, the rubber plug 108 is mounted into the one-way valve hole 1021*a* to form an one-way valve, the one-way valve hole 1021*a* communicates with the interiors of the ink bag and the detection bump 19, and the one-way valve can only allow the ink in the ink bag to flow into the detection bump 190, but do not allow the ink inside the detection bump 190 to flow into the ink bag. The elastic element 107 is mounted into the elastic element hole 1021*b*, the elastic cap 106 is disposed on a top surface of the detection bump 190, and the fixing cap 109 is used for fixing the elastic cap 106 to the cover plate 102. The elastic element 107 supports the elastic cap 106. The communication hole 1021*c* communicates with the interior of the detection bump 190 and the ink outlet 150*a*. When the ink outlet is sucked by the print head of the image forming device to form a negative pressure, the ink may be supplied from the interior of the detection bump 190 to the ink outlet, and further the ink in the ink bag may be supplied to the ink outlet. When it is necessary to detect whether there is ink in the ink cartridge 10, the detection mechanism of the image forming device may abut against a top surface of the elastic cap 106, and when the ink is sufficient, the interior of the detection bump 190 is full of ink, and the detection mechanism of the image forming device cannot flatten the elastic cap 106, and the detection mechanism of the image forming device cannot move to a predetermined detection position, and then the image forming device may recognize that the ink is sufficient. When the ink is insufficient, the detection bump 190 is filled with no ink or is not full of ink, the detection mechanism of the image forming device can flatten the elastic cap 106, and the detection mechanism of the image forming device can be moved to the predetermined detection position, and then the image forming device may recognize that the ink is insufficient.

The ink flow path is shown in FIG. 16-FIG. 18, the ink in the ink bag reaches the one-way valve along the one-way valve hole 1021*a*, and when the one-way valve is opened, the ink enters the interior of the detection bump 190, and then enters the ink outlet along the communication hole 1021*c*.

In the manufacturing process of the ink cartridge 10, the ink may be injected into the ink bag from the ink injection hole 1021 according to the actual situation.

Embodiment 8

Figure 19:
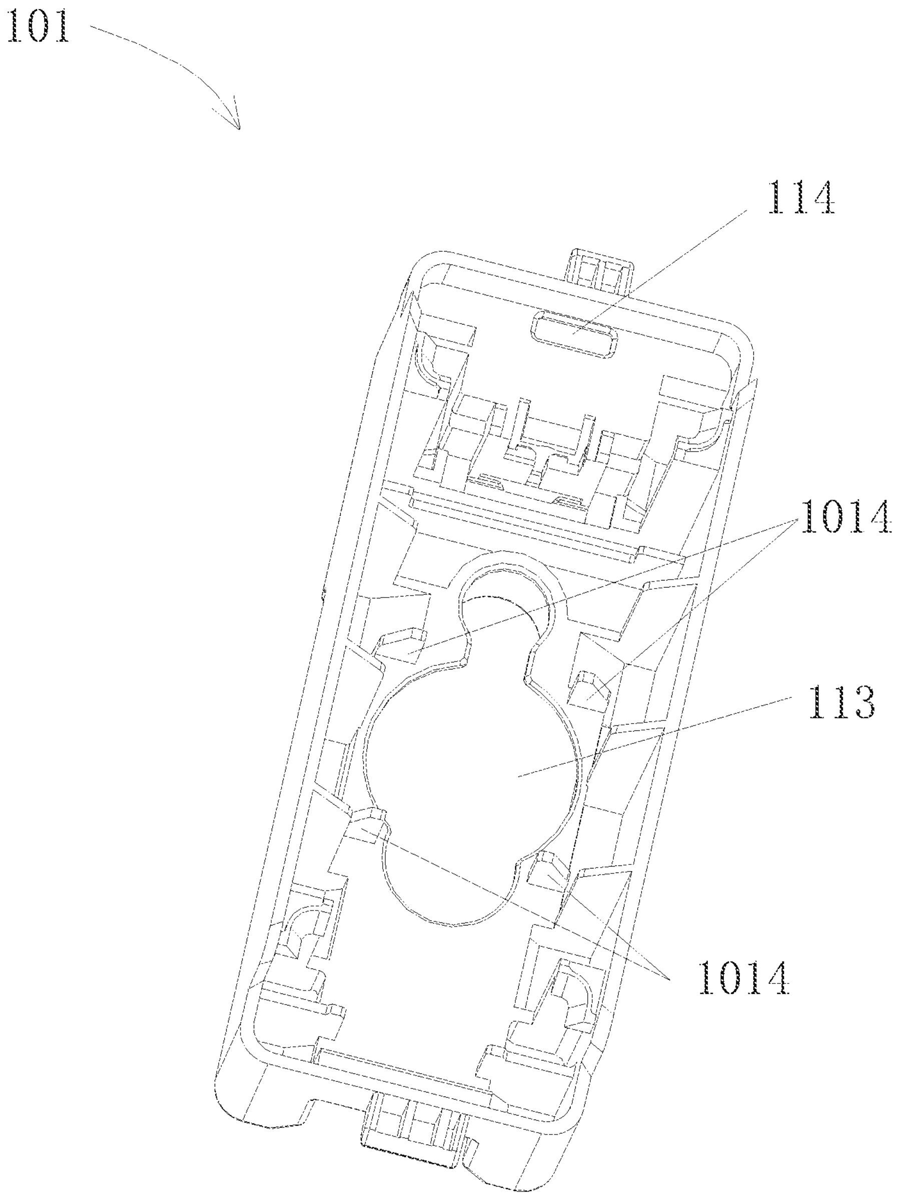
FIG. 19 is a schematic view of a front housing according to Embodiment 8.
Figure 20:
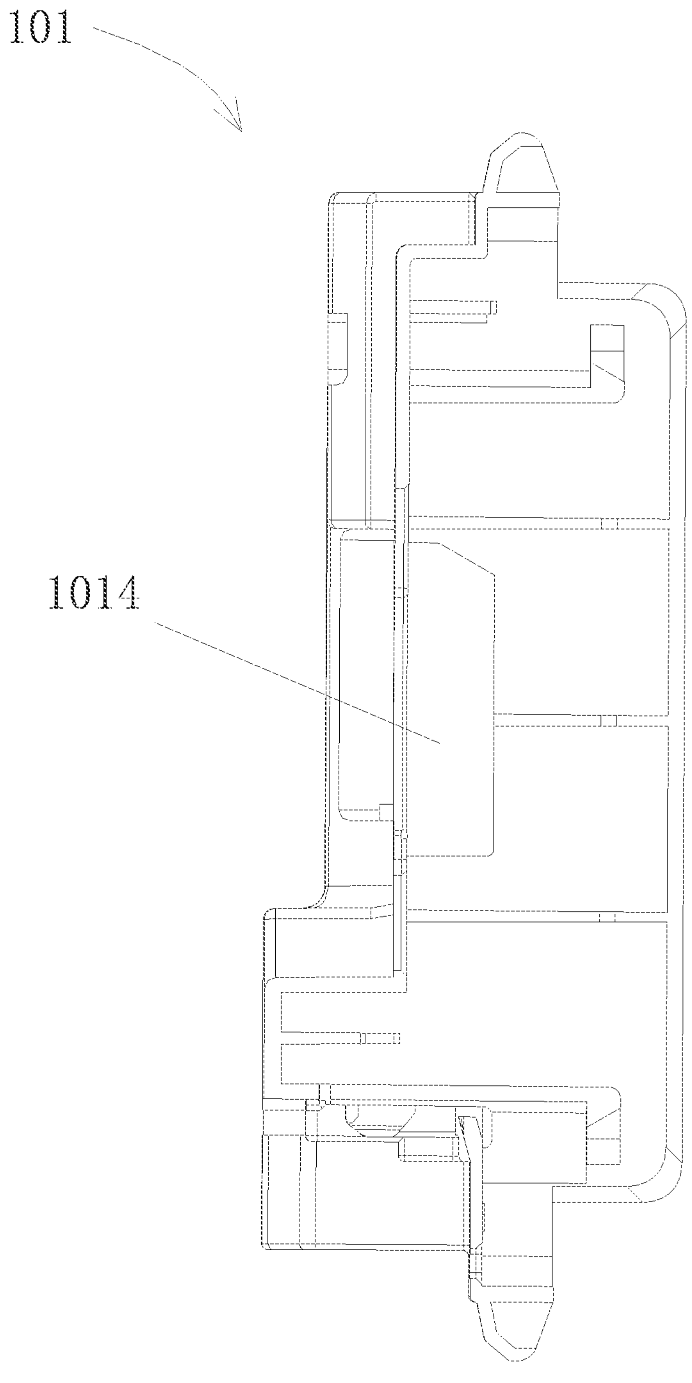
FIG. 20 is another structural schematic view of the front housing in FIG. 19.
Figure 21:
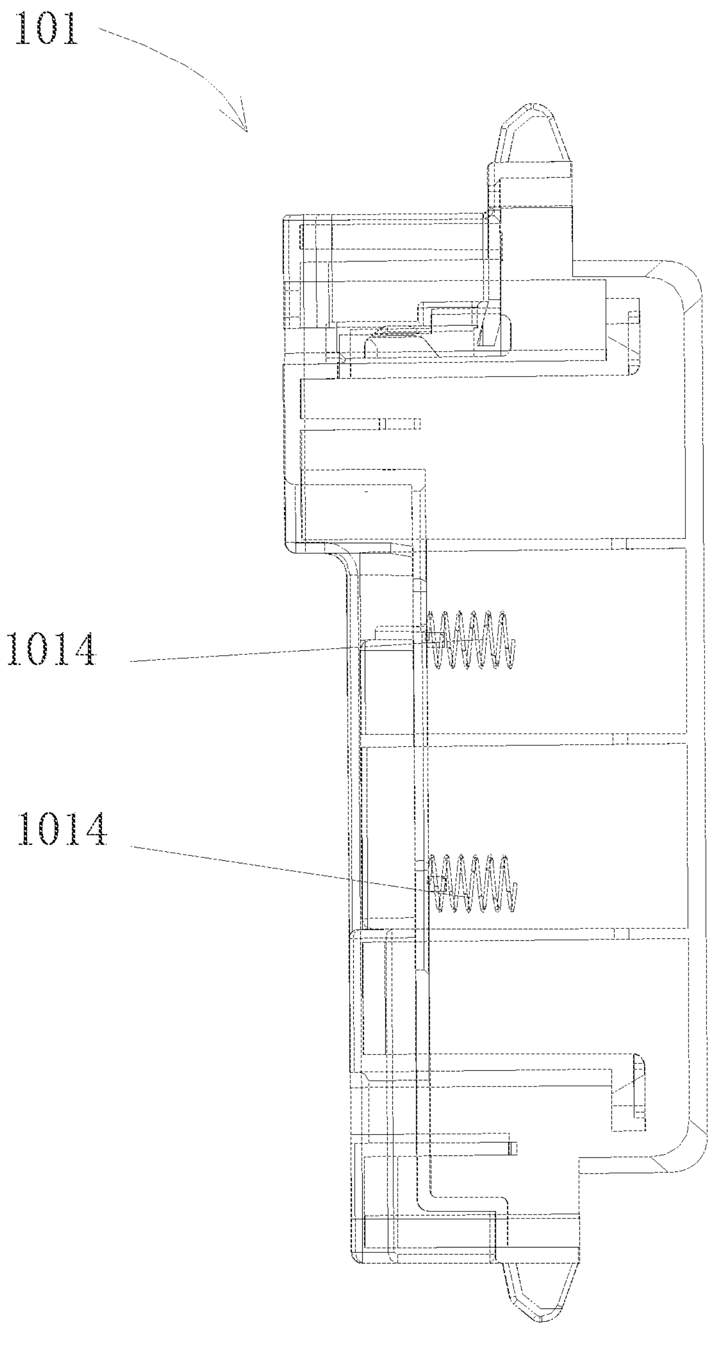
FIG. 21 is yet another structural schematic view of the front housing in FIG. 19.
Figure 22:
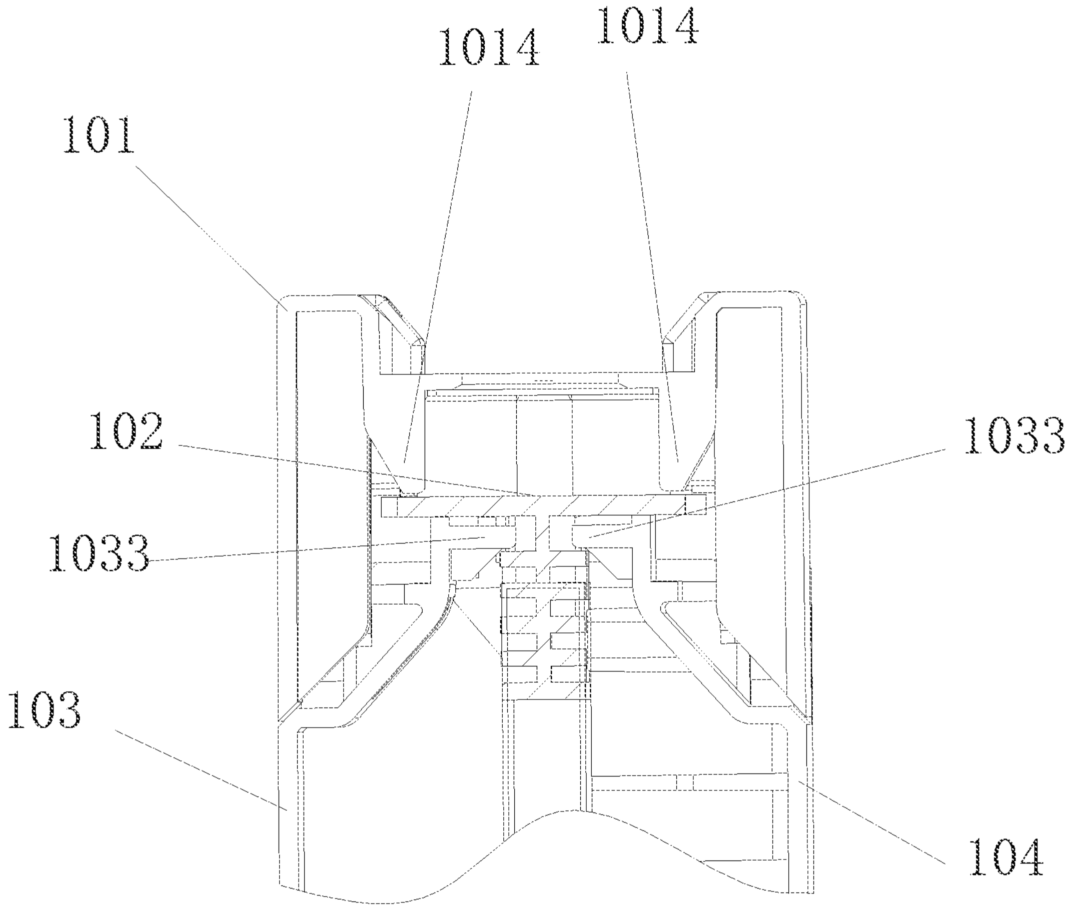
FIG. 22 is a partial structural schematic view of the front housing of FIG. 19 in use state.
Figure 23:
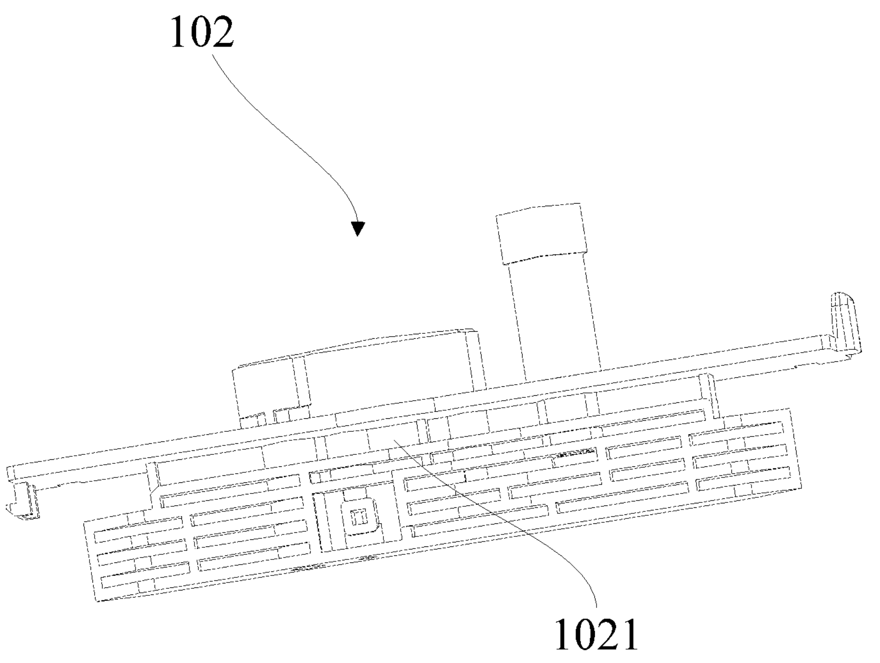
FIG. 23 is a structural schematic view of a cover plate of FIG. 22.
Figure 24:
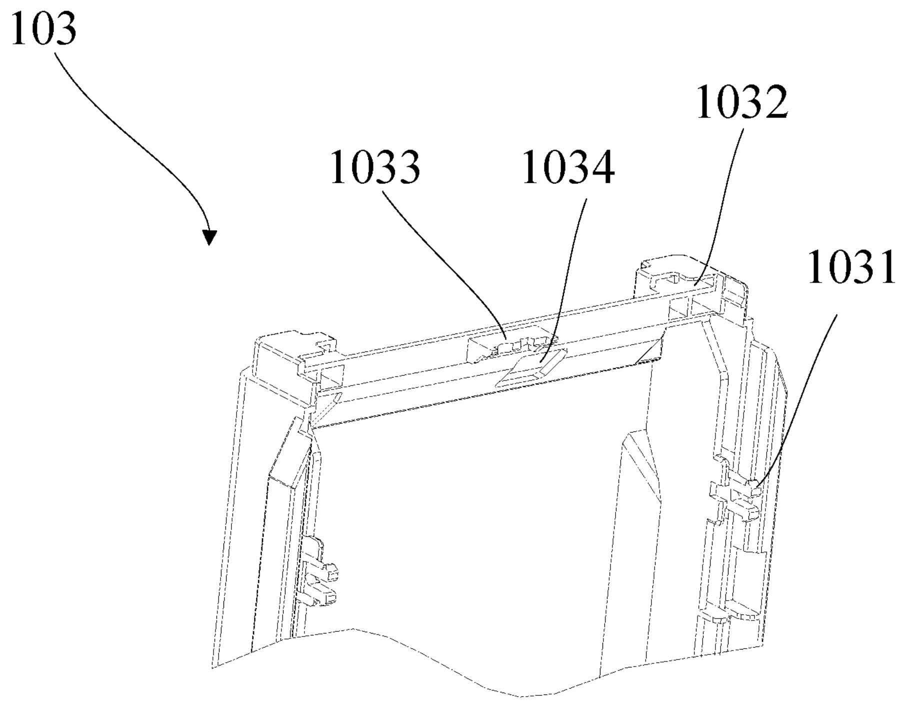
FIG. 24 is a structural schematic view of a left housing of FIG. 22.

FIG. 19 is a schematic view of a front housing according to Embodiment 8; FIG. 20 is another structural schematic view of the front housing in FIG. 19; FIG. 21 is yet another structural schematic view of the front housing in FIG. 19; FIG. 22 is a partial structural schematic view of the front housing of FIG. 19 in an application state; FIG. 23 is a structural schematic view of a cover plate of FIG. 22; and FIG. 24 is a structural schematic view of a left housing of FIG. 22.

The present application provides an ink cartridge including a front housing 101, a rear housing and a cover plate 102, where the cover plate 102 is provided with a detection bump 190 for detecting the amount of ink, a front end of the rear housing is provided with an opening, and the cover plate 102 is disposed on a side of the rear housing provided with the opening, the front housing 101 is mounted at a front end of the opening, and the back of the front housing 101 is provided with an abutting part 1014 for abutting against the cover plate 102, and the abutting part 1014 is close to the detection bump 190 disposed on the cover plate 102.

Where the abutting part 1014 may be a bump or a spring (as shown in FIG. 21), and no specific setting is made here.

It should be noted that the bump may be, for example, in a triangular shape (as shown in FIG. 19) or in a rectangular shape (as shown in FIG. 20), and no specific settings are made here.

By enabling the abutting part 1014 at the back of the front housing 101 to abut against the cover plate 102, it is possible to present the cover plate 102 from deforming when there is too much ink in the ink cartridge, thereby preventing the position offset of the detection bump 190, and thus improving the measurement accuracy of the detection bump.

Optionally, in order to further improve the measurement accuracy of the detection bump 190, there is a plurality of abutting parts 1014 and the plurality of abutting parts 1014 are spaced apart from each other surrounding the edge of the detection bump 190.

Where the abutting part 1014 is disposed close to the detection bump 190. Preferably, the abutting part 1014 disposed close to the detection bump 190 can prevent the cover plate 102 near the detection bump 190 from deforming, so that the position offset of the detection bump 190 can be prevented, thereby improving the measurement accuracy of the detection bump 190.

Optionally, in order to facilitate the maintenance of the ink cartridge, the rear housing includes a left housing 103 and a right housing 104, and the left housing 103 and the right housing 104 are disposed opposite to each other and clamped with each other.

In an optional implementation, a snapping part 1031 is disposed on the left housing 103, a snapped part may be disposed on the right housing 104, and the snapping part 1031 may be clamped to the snapped part, thereby realizing the clamping connection between the left housing 103 and the right housing 104.

The left housing 103 and the right housing 104 surround to form an accommodating part for accommodating ink. An ink bag may be placed in the accommodating part, or the accommodating part may be a sealed housing to store ink directly, and no specific setting is made here. Preferably, an ink bag is disposed in the accommodating part, and the ink bag is welded with the cover plate 102, and the cover plate 102 is clamped in the opening at the front end and blocks the opening at the front end. In other implementations, the ink bag and the cover plate 102 may be fixedly connected in other ways, and no specific setting is made here.

Optionally, in order to realize the positioning and mounting of the cover plate 102, the left housing 103 and/or the right housing 104 are/is provided with a first mounting groove 1032 on an inner wall close to the front end, and the cover plate 102 is inserted in the first mounting groove 1032.

In an optional implementation, the left housing 103 is provided with two first mounting grooves 1032 on the inner wall close to the front end in the Z-axis direction, that is, provided with two first mounting grooves 1032 on the inner wall close to the front end in the up and down direction.

Optionally, in order to prevent the position offset of the detection bump 190, the back surface of the cover plate 102 is provided with a clamping groove 1021, and the left housing 103 and the right housing 104 are provided with a clamping part 1033 matched with the clamping groove 1021. By clamping the clamping part 1033 in the clamping groove, the cover plate 102 can be prevented from deformation that causes the position offset of the detection bump 190, and thus the measurement accuracy of the detection bump 190 can be improved.

The position of the clamping groove may be disposed on the back surface of the cover plate 102 and close to the detection bump 190. Of course, in other implementations, the position of the clamping groove may also be far away from the detection bump 190, and no specific setting is made here. Preferably, in order to improve the measurement accuracy of the detection bump 190, the center of the clamping groove is located in the same horizontal plane as the center of the detection bump 190.

It should be noted that the back surface of the cover plate 102 is a surface close to the left housing 103 and the right housing 104.

Optionally, in order to facilitate the observation of ink in the ink cartridge, a window 1034 for observing the amount of ink in the accommodating part is disposed on the left housing 103 and/or the right housing 104.

In an optional implementation, a window 1034 for observing ink injection is disposed at the front end of the left housing 103.

The rest is the same as Embodiment 1.

Embodiment 9

Figure 25:
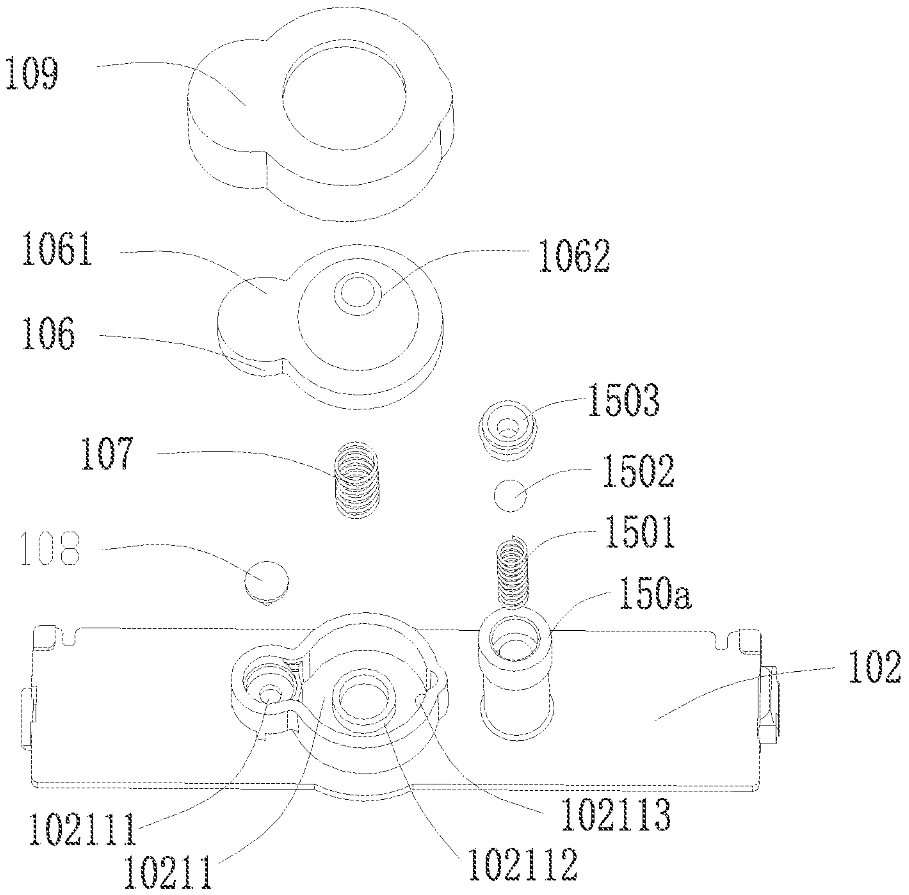
FIG. 25 is an exploded perspective view of an ink amount detecting mechanism according to Embodiment 9.

Referring to FIG. 25, FIG. 25 is an exploded perspective view of an ink amount detection mechanism according to Embodiment 9.

The embodiment of the present application provides an ink amount detection mechanism including an ink flow path and an elastic cap 106 disposed on the ink flow path, Head and tail ends of the ink flow path are respectively connected with an ink bag 105 and a printer. The ink of the ink bag 105 is fed into the printer through the ink flow path.

The elastic cap 106 includes a deformable part 1062. The deformable part 1062 is made of a soft elastic material and is easily deformed under stress, an end of the deformable part 1062 close to the ink flow path may contact with the ink in the ink flow path, a surface of the deformable part 1062 facing away from the ink flow path is provided with a contact force-bearing point, and an orthographic projection of the contact force-bearing point on the cover plate 102 is located at a center of an orthographic projection of the deformable part 1062 on the cover plate 102.

The contact force-bearing point abuts against a detection rod 23 in a mounting part 20 of the printer mentioned later. Since the orthographic projection of the contact force-bearing point of the detection rod 23 and the elastic cap 106 on the cover plate 102 is located at the center of the orthographic projection of the deformable part 1062 on the cover plate 102, and the force acting on a circumferential wall of the deformable part 1062 is uniform, the elastic cap 106 can be deformed more stably, which prevents a large error in the displacement of the detection rod 23, and makes the detection more accurate until the ink is exhausted.

Figure 29A:
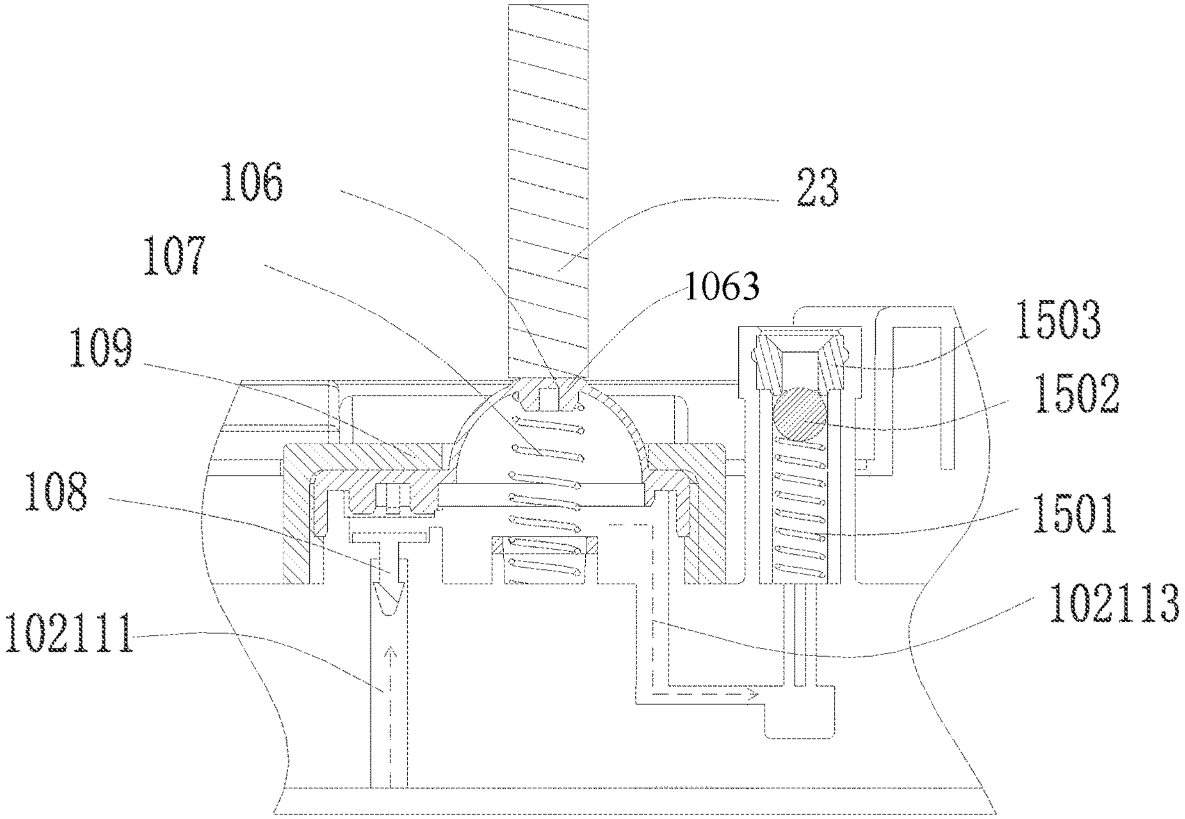
FIG. 29*a* is an initial state diagram of a detection rod matching with an elastic cap according to Embodiment 9.

Referring to FIG. 29*a*, FIG. 29*a* is an initial state diagram of the detection rod 23 matched with the elastic cap 106 according to Embodiment 9. When the printer starts working, the detection rod 23 of the mounting part 20 of the printer contacts the contact force-bearing point at the center of the deformable part 1062 of the elastic cap 106, the ink flows out of the ink bag 105 and reaches the printer through the ink flow path, and dotted arrows in the figure indicate the flow direction of the ink. At this time, the amount of compression of the deformable part 1062 against which the detection rod 23 of the printer abuts is very small, and the deformable part 1062 has almost no compression deformation, and the information detected by the detection mechanism of the printer prompts that the ink cartridge 10 still has enough ink, and the printing operation can be continued.

When the printer is in a working state, the ink is sucked by the printer, and the ink flows out of the ink bag 105 and then reaches the printer through the ink flow path, and a negative pressure is formed in the ink flow path, so the elastic cap 106 is subjected to thrust coming from the detection rod 23 and produces a compression deformation toward the ink flow path. However, the negative pressure generated in the ink flow path may be slowly eliminated by continuous flow of the ink through the ink flow path. In the working process of the printer, the elastic cap 106 is repeatedly slightly deformed and then returns to its initial state, and in this process, because distances from the contact force-bearing point of the elastic cap 106 to the circumferential wall of the deformable part 1062 of the elastic cap 106 are equal, the deformable part 1062 is steadily deformed, so that the detection is more accurate.

Figure 29B:
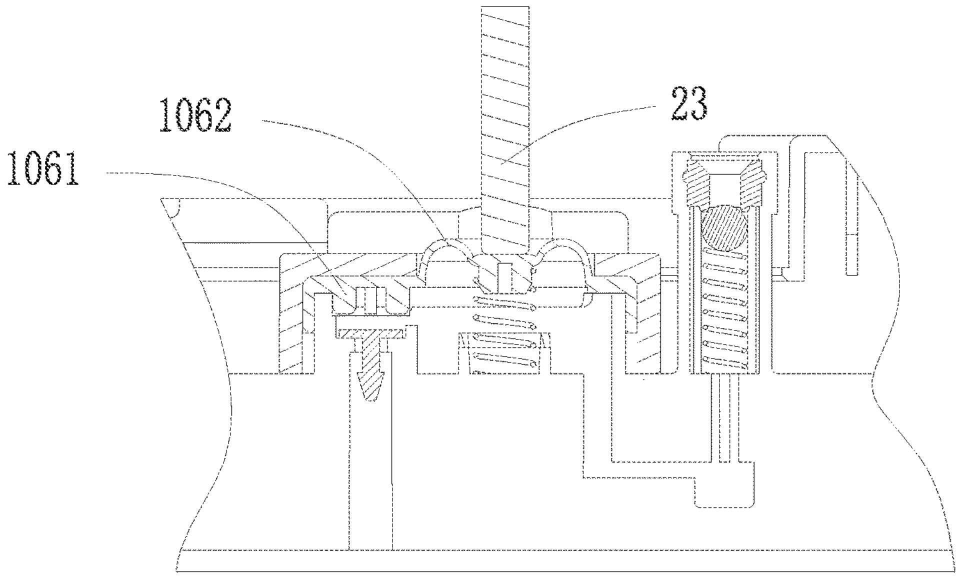
FIG. 29*b* is a changed state diagram of the detection rod and the elastic cap at an ink-exhaustion stage according to Embodiment 9.

Referring to FIG. 29*b*, FIG. 29*b* is a changed state diagram of both the detection rod 23 and the elastic cap 106 at an ink exhaustion stage according to Embodiment 9. When the ink of the ink flow path is exhausted, the elastic cap 106 may not return to the initial state after deformation, and the deformable part 1062 of the elastic cap 106 remains compressed toward the ink flow path, and at this time, the detection rod 23 may not return to the initial state after displacement, so the ink exhaustion can be detected, and thus the printer prompts that the ink is exhausted.

Further, the elastic cap 1061 includes a body 1061. The body 1061 is connected to the periphery of the deformable part 1062, preferably in an integrated molding mode, and the body 1061 is made of a hard material and is not easy to deform, the longitudinal cross-section of the deformable part 1062 is symmetrical, and is preferably in a regular shape such as a circle, a regular polygon (such as a regular triangle, a regular quadrilateral) and a cone. The periphery of an end with the largest diameter of the deformable part 1062 is connected with the body 1061, and the contact force-bearing point is located at an minimum diameter end of the deformable part 1062, so that distances from the contact force-bearing point to the arc surface of the periphery of the deformable part 1062 are equal to each other, and the force applied at the contact force-bearing point squeeze the deformable part 1062, so that the deformable part 1062 is deformed from the end with a smaller diameter to the end with a larger diameter. Since the deformable part 1062 is in a regular symmetrical structure, the deformation of the deformable part 1062 is more stable and the detection accuracy is improved.

Further, the ink cartridge 10 further includes a cover plate 102 and an elastic element 107, the cover plate 102 is preferably welded and fixed to the ink bag 105, and the elastic element 107 is disposed on a side of the cover plate 102 facing away from the ink bag 105 to support the deformable part 1062. The cover plate 102 is also provided with an ink outlet 150*a* and a liquid chamber 10211, and the liquid chamber 10211 is provided with a flow inlet 102111 and a flow outlet 102113, the flow outlet 102113 is communicated with the ink outlet 150*a*, and the flow inlet 102111 is communicated with the ink bag 105. The ink in the ink flow path sequentially flows through the flow inlet 102111, the liquid chamber 10211 and the flow outlet 102113, and then is fed to the printer from the ink outlet 150*a*.

In the process of detecting the residual amount, the amount of ink is detected by the cooperation of the elastic cap 106 and the elastic element 107 and matching with the detection rod 23 of the printer.

As shown in FIG. 29*a*, at this time, it is an initial state in which the detection rod 23 is matched with the elastic cap 106, in order to increase the volume of the liquid chamber 10211, the elastic element 107 pushes up the deformable part 1062 of the elastic cap 106, so as to make the deformable part 1062 in the initial state. At this time, the compression amount of the elastic cap 106 against which the detection rod 23 of the printer abuts is very small, and the deformable part 1062 has almost no compression deformation.

When the printer is in the working state, since the negative pressure is formed in the liquid chamber 10211, the elastic cap 106 is compressed by the thrust of the detection rod 23 towards the liquid chamber 10211 to compress the elastic element 107, and is deformed in a manner of being led to the inside of the liquid chamber 10211. However, the negative pressure generated in the liquid chamber 10211 may be slowly eliminated by the ink continuously reaching the liquid chamber 10211 through the flow inlet 102111, and at this time, the elastic cap 106 is pushed outward again by the reaction force of the elastic element 107, the elastic cap 106 returns to the undeformed state, and the volume of the liquid chamber 10211 returns to the initial state. Therefore, in the working process of the printer, the elastic cap 106 repeatedly undergoes slight deformation and restoration of the original state.

As shown in FIG. 29*b*, at this time, the ink cartridge 10 is in the ink exhaustion stage, and in the process that the ink bag 105 continuously supplies ink to the printer through the liquid chamber 10211, when the ink of the ink bag 105 is exhausted, the elastic cap 106 compresses the elastic element 107, the supporting force of the elastic element 107 is overcome, the elastic cap 106 is deformed in a manner of being led to the inside of the liquid chamber 10211, and may not return to the initial state.

Further, an inner diameter of the flow outlet 102113 is larger than an inner diameter of the flow inlet 102111, so that an outflow velocity is greater than an inflow velocity, and thus a negative pressure is formed in the liquid chamber 10211, so that after the ink in the liquid chamber 10211 is exhausted, the deformable part 1062 of the elastic cap 106 keeps the state of being compressed toward the liquid chamber 10211, and at this time, the detection rod 23 may not return the initial state after displacement, and the ink exhaustion can be detected, and then the printer prompts that the ink is exhausted.

Further, the elastic element 107 is a first spring, a first bump 102112 is convexly disposed on a bottom surface of the liquid chamber 10211, and a top of the first bump 102112 is provided with a groove to accommodate the spring, the minimum diameter end of the deformable part 1062 is convexly provided with a second bump 1063 facing the liquid chamber 10211, and head and tail ends of the first spring are connected with the first bump 102112 and the second bump 1063, respectively. The deformable part 1062 is supported by the elastic restoring force of the first spring so that it has a tendency to return to the initial state.

Further, the flow inlet 102111 is provided with a rubber plug 108. The rubber plug 108 may only allow the ink in the ink bag 10211 to flow into the liquid chamber 10211, but do not allow the ink inside the liquid chamber 10211 to flow into the ink bag 105.

Further, the ink cartridge 10 further includes a fixing cap 109, and the fixing cap 109 is used for fixing the elastic cap 106 to the liquid chamber 10211 and closing the top of the liquid chamber 10211. A bottom surface of the fixing cap 109 is concavely provided with a first groove, the first groove is used for partially receiving the liquid chamber 10211, a bottom surface of the first groove has a second groove running therethrough, and the second groove is used for the deformable part 1062 to extend out.

Further, the ink outlet 150*a* includes a second elastic element 1501, a sphere 1502 and a sealing plug 1503, where the sealing plug 1503 is disposed at a top end of the ink outlet 150*a*, and the sphere 1502 is disposed close to the top end of the ink outlet 150*a*, and the second elastic element 1501 is used to support the sphere 1502. The second elastic element 1501, the sphere 1502 and the sealing plug 1503 are combined to form a valve structure for opening or closing the ink outlet 150*a*, the second elastic element 1501 is a second spring, one end of the second elastic element 1501 is fixed at a bottom end of the ink outlet 150*a*, and the sphere 1502 is disposed on the top end of the second elastic element 1501 and forms a valve core together with the second elastic element 1501, the sealing plug 1503 is located at the end of the ink outlet 150*a*, plays a sealing role, and matches with the external size of an ink suction needle 22 when the ink cartridge 10 is inserted into the mounting hole 21, and it constitutes the valve body of the valve unit.

Figure 26:
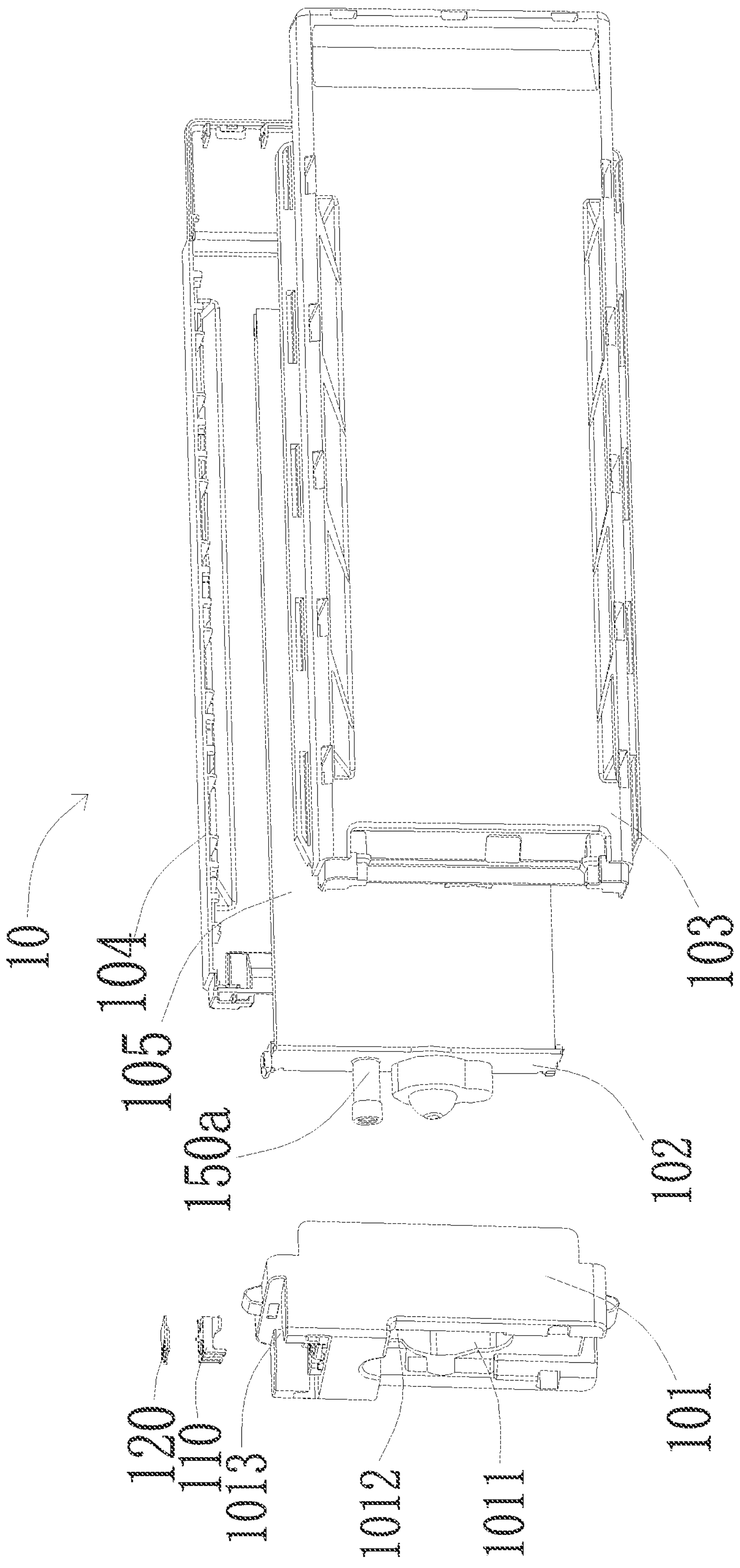
FIG. 26 is an exploded perspective view of an ink cartridge according to Embodiment 9.
Figure 27:
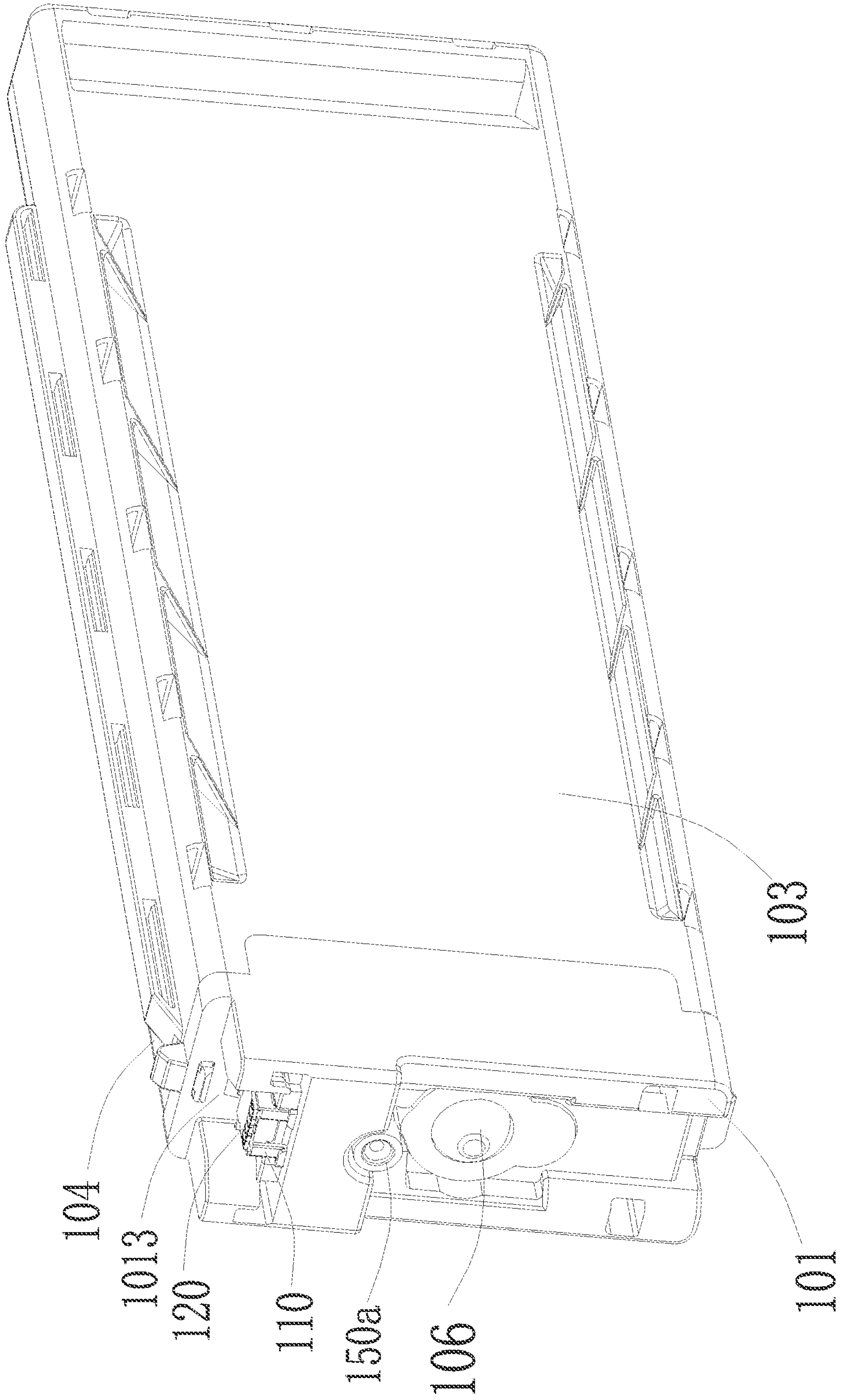
FIG. 27 is an assembled perspective view of the ink cartridge of FIG. 26.

The present application also provides an ink cartridge 10, as shown in FIG. 26 and FIG. 27, where FIG. 26 is an exploded perspective view of the ink cartridge 10 according to Embodiment 9, and FIG. 27 is a combined perspective view of the ink cartridge 10.

The ink cartridge 10 includes an ink bag 105, a cartridge body 100 and the ink amount detection mechanism mentioned above. The cartridge body 100 includes a left housing 103, a right housing 104 and a front housing 101, where the left housing 103 and the right housing 104 are combined to form a box shape, the left housing 103, the right housing 104 and the front housing 101 are enclosed to form an accommodating part for accommodating the ink bag 105, and it can be known for those skilled in the art that the accommodating part may also be provided as a sealed housing to be used to store ink directly; the cover plate 102 is connected with the ink bag 105, the front housing 101 is provided with a detection hole 1011 for the elastic cap 106 to extend out and an ink outlet hole 1012 for the ink outlet 150*a* to extend out.

An upper housing of the ink outlet hole 1012 is also provided with a second mounting groove 1013 for mounting the chip 120, where the chip 120 is mounted to the chip holder 110, and then the chip holder 110 is mounted into the second mounting groove 1013, the chip 120 is used to store basic information of the ink cartridge 10 and to perform mounting detection when the ink cartridge 10 is mounted into the printer. When the ink amount detection mechanism and the ink bag 105 are combined and mounted into the cartridge body 100, and then the chip holder 110 mounted with the chip 120 is mounted to the cartridge body 100, a complete ink cartridge 10 is formed, and when the ink cartridge 10 is mounted to the mounting part 20, the chip 120 is in contact with a stylus part of a printer side terminal unit to form an electrical connection, and then the storage information in the wafer and the information in the printer may be interacted, authenticated, and maintained. For example, when the ink in the ink cartridge 10 is continuously consumed, the ink amount information in the chip 120 may change with the amount of printing.

Figure 28:
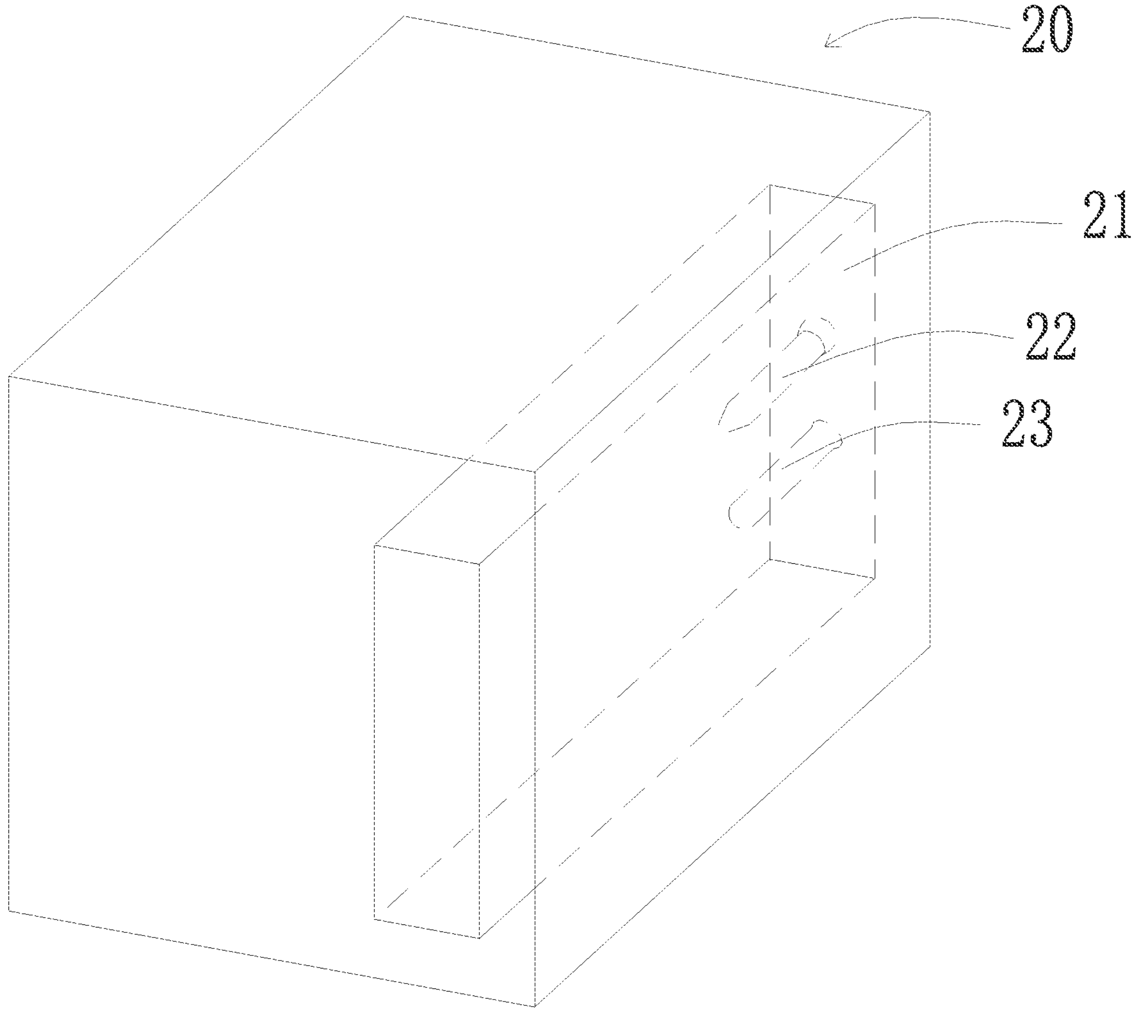
FIG. 28 is a perspective view of the ink cartridge mounted to a mounting part of a printer according to Embodiment 9.

This embodiment also provides a printer, as shown in FIG. 28, and FIG. 28 is a perspective view of the ink cartridge 10 mounted to a mounting part of a printer according to Embodiment 9.

The printer includes a mounting part 20, which is provided with a mounting hole 21 for receiving the ink cartridge 10 mentioned above.

The ink cartridge 10 faces the mounting hole 21 of the mounting part 20 of the printer, and is inserted into the mounting hole 21 from outside to inside, an ink suction needle 22 for sucking the ink is provided in the mounting hole 21, and when the ink cartridge 10 is mounted in the mounting hole 21, the ink suction needle 22 matches with the ink outlet 150*a* of the ink cartridge 10 so as to supply the ink of the ink cartridge 10 to the mounting part 20 and then to the print head of the printer through the mounting part 20, to start printing.

A detection rod 23 is disposed below a vertical direction of the ink suction needle 22, and a light sensor (not shown) that matches with the detection rod 23 is disposed at a rear end of the detection rod 23, and the light sensor is provided with a matching groove, and when the remaining amount of the ink in the ink cartridge 10 is sufficient, the detection rod 23 has no displacement or has a very small displacement, and the rear end of the detection rod 23 does not enter the matching groove of the light sensor, and at this time, the light sensor may transmit light, which indicates that the ink is sufficient; when the ink is exhausted, the detection rod 23 moves, and the rear end thereof is moved into the mating groove of the light sensor, and at this time, the light of the sensor is blocked, indicating that the ink in the ink cartridge 10 has been exhausted.

The working principle of this embodiment is as follows.

FIG. 29*a* is an initial state diagram of the detection rod 23 matched with the elastic cap 106 according to Embodiment 9. When the printer starts working, the detection rod 23 of the mounting part 20 of the printer contacts the contact force-bearing point at the center of the deformable part 1062 of the elastic cap 106, and in order to increase the volume of the liquid chamber 10211, the elastic element 107 pushes up the deformable part 1062 of the elastic cap 106, so as to make it in the initial state. Due to the increase in the volume of the liquid chamber 10211, the ink flows out of the ink bag 105 and reaches the liquid chamber 10211 through the flow inlet 102111 of the liquid chamber 10211, and then flows out from the flow outlet 102113 of the liquid chamber 10211 and reaches the ink outlet 150*a*, and supply of the ink to the printer is controlled by the ink outlet 150*a*. The rubber plug 108 is disposed in the flow inlet 102111 of the liquid chamber 10211, the rubber plug 108 allows the ink to flow out from the ink bag 105 and to be supplied to the liquid chamber 10211 through flow inlet 102111, and the rubber plug 108 prevents the ink from flowing backwards from the liquid chamber 10211 to the flow inlet 102111, and dotted arrows in the figure indicate the flow direction of the ink. At this time, the amount of compression of the elastic cap 106 against which the detection rod 23 of the printer abuts is very small, and the deformable part 1062 has almost no compression deformation, and then the information detected by the detection mechanism of the printer prompts that the ink cartridge 10 still has enough ink, and the printing working can be continued.

When the printer is in the working state, the ink is sucked by the ink outlet 150*a*, the ink flows into the liquid chamber 10211 through the flow inlet 102111, and then is supplied from the flow outlet 102113 to the ink outlet 150*a*. Since the inner diameter of the flow outlet 102113 is larger than the inner diameter of the flow inlet 102111, and thus the outflow velocity is greater than the inflow velocity, a negative pressure is formed in the liquid chamber 10211, so that the elastic cap 106 is subjected to a thrust of the detection rod 23 and compresses the elastic element 107 towards the liquid chamber 10211, and is deformed in a manner of being led to the inside of the liquid chamber 10211. However, the negative pressure generated in the liquid chamber 10211 may be slowly eliminated through the ink continuously reaching the liquid chamber 10211 through the flow inlet 102111, and at this time, the elastic cap 106 is pushed outward again by the reaction force of the elastic element 107, the elastic cap 106 returns to the undeformed state, and the volume of the liquid chamber 10211 returns to the initial state. Therefore, during the operation of the printer, the elastic cap 106 repeatedly undergoes slight deformation and restoration to original state, and in this process, since the distances from the contact points between the elastic cap 106 and the detection rod 23 to the deformable part 1062 of the elastic cap 106 are equal, the deformable part 1062 is steadily deformed, making the detection more accurate.

FIG. 29*b* is a changed state diagram of the detection rod 23 and the elastic cap 106 in the ink exhaustion stage according to Embodiment 9. As mentioned above, there is a negative pressure in the liquid chamber 10211, and in the process that the ink bag 105 continuously supplies ink to the printer through the liquid chamber 10211, when the ink of the ink bag 105 is exhausted, the elastic cap 106 compresses the elastic element 107, is deformed in a manner of being led to the inside of the liquid chamber 10211, and may not return the initial state, the deformable part 1062 of the elastic cap 106 keeps the state of being compressed toward the liquid chamber 10211, and at this time, the detection rod 23 may not return to the initial state after displacement, and the ink exhaustion can be detected, and then the printer prompts that the ink is exhausted.

The above are only preferred specific embodiments of the present application, but the scope of protection of the present application is not limited to these, any changes or replacements that can easily be conceived by any skilled person familiar with the technical field within the scope of the technology disclosed in the present application, shall be covered by the scope of protection of the present application. Therefore, the scope of protection of the present application shall be subject to the scope of protection of the claims.

What is claimed is:

1. An ink cartridge detachably mounted in a mounting part of an image forming device, the ink cartridge comprising:

a cartridge body comprising an ink accommodating chamber for storing an ink;

a recess part disposed on an upper side of the cartridge body and comprising a side wall, wherein at least a portion of the side wall is configured to limit a relative position between the ink cartridge and the image forming device in a first direction;

a chip disposed in the recess part; and a positioning part disposed above the side wall, wherein in a second direction, at least a portion of the positioning part is located on a rear end side of the chip and is configured to limit the relative position between the ink cartridge and the image forming device in a third direction; wherein the first direction is a width extension direction of the cartridge body, the second direction is a mounting direction of the ink cartridge mounted to the mounting part, and the third direction is a height extension direction of the cartridge body;

wherein the side wall comprises a rear side wall;

the positioning part is disposed on an extension wall of the rear side wall;

the extension wall is flush with the rear side wall, and the extension wall is located above the recess part; and the rear side wall has a first surface, and the positioning part protrudes out of the first surface and extends in the second direction.

2. The ink cartridge according to claim 1, wherein the mounting part is provided with a terminal unit, and both sides of the terminal unit are provided with a bump; and when the ink cartridge is mounted to the mounting part in the second direction, the chip contacts with the terminal unit; the side wall abuts against the bump to limit the relative position between the ink cartridge and the image forming device, and the positioning part is disposed above the recess part.

3. The ink cartridge according to claim 2, wherein the side wall comprises a left side wall and a right side wall; the left side wall has a first positioning surface, and the right side wall has a second positioning surface disposed opposite to the first positioning surface in the first direction; the first positioning surface and/or the second positioning surface abut against the bump; and the first positioning surface and/or the second positioning surface are/is located above the chip.

4. The ink cartridge according to claim 3, wherein the recess part has a first guiding surface and a second guiding surface disposed opposite to each other, the first guiding surface is connected to the first positioning surface and is located at an opening of the recess part, and the second guiding surface is connected to the second positioning surface and is located at the opening of the recess part.

5. The ink cartridge according to claim 4, wherein the ink cartridge further comprises a fixing mechanism disposed on an upper surface and/or a lower surface of the cartridge body.

6. The ink cartridge according to claim 4, wherein a front surface of the cartridge body is further provided with at least one positioning hole for limiting the relative position between the ink cartridge and the image forming device.

7. The ink cartridge according to claim 3, wherein the rear side wall is connected with the left side wall and the right side wall, respectively, and is located between the left side wall and the right side wall.

8. The ink cartridge according to claim 7, wherein a bottom surface of the positioning part is disposed as an inclined surface, the inclined surface is inclined relative to the second direction, and a thickness of an end of the positioning part away from the rear side wall is less than a thickness of an end of the positioning part close to the rear side wall.

9. The ink cartridge according to claim 8, wherein the ink cartridge further comprises a fixing mechanism disposed on an upper surface and/or a lower surface of the cartridge body.

10. The ink cartridge according to claim 7, wherein the ink cartridge further comprises a fixing mechanism disposed on an upper surface and/or a lower surface of the cartridge body.

11. The ink cartridge according to claim 7, wherein a front surface of the cartridge body is further provided with at least one positioning hole for limiting the relative position between the ink cartridge and the image forming device.

12. The ink cartridge according to claim 3, wherein the ink cartridge further comprises a fixing mechanism disposed on an upper surface and/or a lower surface of the cartridge body.

13. The ink cartridge according to claim 3, wherein a front surface of the cartridge body is further provided with at least one positioning hole for limiting the relative position between the ink cartridge and the image forming device.

14. The ink cartridge according to claim 2, wherein the ink cartridge further comprises a fixing mechanism disposed on an upper surface and/or a lower surface of the cartridge body.

15. The ink cartridge according to claim 2, wherein a front surface of the cartridge body is further provided with at least one positioning hole for limiting the relative position between the ink cartridge and the image forming device.

16. The ink cartridge according to claim 1, wherein the ink cartridge further comprises a fixing mechanism disposed on an upper surface and/or a lower surface of the cartridge body.

17. The ink cartridge according to claim 16, wherein the fixing mechanism comprises a first fixing part and a second fixing part, and the first fixing part and the second fixing part are spaced on the upper surface and/or the lower surface of the cartridge body in the second direction; or the first fixing part and the second fixing part are spaced on the upper surface and/or the lower surface of the cartridge body in the first direction.

18. The ink cartridge according to claim 1, wherein the ink cartridge further comprises a fixing mechanism disposed on an upper surface and/or a lower surface of the cartridge body.

19. The ink cartridge according to claim 1, wherein a front surface of the cartridge body is further provided with at least one positioning hole for limiting the relative position between the ink cartridge and the image forming device.

* * * * *